(12) United States Patent
Irvin, Sr.

(10) Patent No.: US 9,714,176 B2
(45) Date of Patent: Jul. 25, 2017

(54) DESALINATION AND/OR GAS PRODUCTION SYSTEM AND METHOD

(71) Applicant: QWTIP LLC, Park City, UT (US)

(72) Inventor: Whitaker Ben Irvin, Sr., Sandy, UT (US)

(73) Assignee: QWTIP LLC, Park City, UT (US)

( * ) Notice: Subject to any disclaimer, the term of this patent is extended or adjusted under 35 U.S.C. 154(b) by 452 days.

(21) Appl. No.: 14/471,870

(22) Filed: Aug. 28, 2014

(65) Prior Publication Data
US 2015/0144478 A1    May 28, 2015

Related U.S. Application Data

(63) Continuation of application No. PCT/US2013/028449, filed on Feb. 28, 2013.

(60) Provisional application No. 61/604,482, filed on Feb. 28, 2012, provisional application No. 61/700,475, filed on Sep. 13, 2012.

(51) Int. Cl.
| | |
|---|---|
| C02F 1/00 | (2006.01) |
| C02F 1/04 | (2006.01) |
| C02F 1/38 | (2006.01) |
| C01B 3/04 | (2006.01) |
| C01B 13/02 | (2006.01) |
| B01D 19/00 | (2006.01) |
| B04C 5/08 | (2006.01) |

(Continued)

(52) U.S. Cl.
CPC ............ *C02F 1/04* (2013.01); *B01D 19/0057* (2013.01); *B04C 5/08* (2013.01); *C01B 3/042* (2013.01); *C01B 13/0207* (2013.01); *F04D 5/001* (2013.01); *C02F 1/005* (2013.01); *C02F 1/38* (2013.01); *C02F 2103/08* (2013.01); *C02F 2209/05* (2013.01); *Y02E 60/364* (2013.01)

(58) Field of Classification Search
CPC .... C02F 1/04; C02F 1/005; C02F 1/38; C02F 2103/08; C02F 2209/005; C01B 13/0207; C01B 3/042; B01D 19/0057; B04C 5/08; F04D 5/001; Y02E 60/364
See application file for complete search history.

(56) References Cited

U.S. PATENT DOCUMENTS

| | | |
|---|---|---|
| 699,636 A | 5/1902 | Thrupp |
| 1,061,206 A | 5/1913 | Tesla |

(Continued)

FOREIGN PATENT DOCUMENTS

| | | | | |
|---|---|---|---|---|
| AT | 196680 | 3/1958 | | |
| BR | WO 2009109020 A1 * | 9/2009 | ............... | F03B 1/02 |

(Continued)

OTHER PUBLICATIONS

The Chapter I, International Preliminary Report on Patentability for PCT/US2013/028449, Sep. 2, 2014.*

(Continued)

*Primary Examiner* — David A Reifsnyder
(74) *Attorney, Agent, or Firm* — Cahn & Samuels, LLP

(57) ABSTRACT

A system and method are provided in at least one embodiment to process water to produce gas that can be separated into at least two gas flows using a water treatment system having a disk-pack rotating in it to cause out gassing from the water. In a further embodiment, the method and system use the gas released from the water to produce substantially fresh water from the processed salt water.

20 Claims, 22 Drawing Sheets

(51) Int. Cl.
*F04D 5/00* (2006.01)
*C02F 103/08* (2006.01)

(56) References Cited

U.S. PATENT DOCUMENTS

| | | | |
|---|---|---|---|
| 2,601,519 | A | 6/1952 | Hardy et al. |
| 3,487,784 | A | 1/1970 | Rafferty et al. |
| 3,632,221 | A | 1/1972 | Uehling |
| 3,731,800 | A | 5/1973 | Timson |
| 4,042,351 | A | 8/1977 | Anderson |
| 4,118,207 | A | 10/1978 | Wilhelm |
| 4,361,490 | A | 11/1982 | Saget |
| 5,215,501 | A | 6/1993 | Ushikoshi |
| 5,248,238 | A | 9/1993 | Ishida et al. |
| 5,254,250 | A | 10/1993 | Rolchigo et al. |
| 5,376,263 | A | 12/1994 | Fischel |
| 5,498,329 | A | 3/1996 | Lamminen et al. |
| 5,778,696 | A | 7/1998 | Conner |
| 6,116,430 | A | 9/2000 | Horton |
| 6,227,795 | B1 | 5/2001 | Schmoll, III |
| 6,328,527 | B1 | 12/2001 | Conrad et al. |
| 6,719,817 | B1 * | 4/2004 | Marin ............ B01J 7/00 422/225 |
| 6,873,235 | B2 | 3/2005 | Fiske et al. |
| 6,890,443 | B2 | 5/2005 | Adams |
| 7,074,008 | B2 | 7/2006 | Motonaka |
| 7,341,424 | B2 | 3/2008 | Dial |
| 7,462,945 | B2 | 12/2008 | Baarman |
| 7,489,060 | B2 | 2/2009 | Qu et al. |
| 8,623,212 | B2 * | 1/2014 | Irvin, Sr. ............ B01D 21/262 210/330 |
| 8,636,910 | B2 | 1/2014 | Irvin, Sr. et al. |
| 9,469,553 | B2 * | 10/2016 | Irvin, Sr. .......... C02F 1/38 |
| 9,474,991 | B2 * | 10/2016 | Irvin, Sr. .......... B01D 21/2411 |
| 9,605,663 | B2 * | 3/2017 | Irvin, Sr. .......... F03G 7/00 |
| 2004/0009063 | A1 | 1/2004 | Polacsek |
| 2004/0107681 | A1 | 6/2004 | Carlsson et al. |
| 2004/0159085 | A1 | 8/2004 | Carlsson et al. |
| 2006/0000383 | A1 | 1/2006 | Nast |
| 2006/0054549 | A1 | 3/2006 | Schoendorfer |
| 2006/0233647 | A1 | 10/2006 | Saunders |
| 2006/0272624 | A1 | 12/2006 | Pettersson |
| 2007/0089636 | A1 | 4/2007 | Guardo, Jr. |
| 2007/0144956 | A1 | 6/2007 | Park et al. |
| 2008/0067813 | A1 | 3/2008 | Baarman et al. |
| 2008/0168899 | A1 | 7/2008 | Decker |
| 2009/0078150 | A1 | 3/2009 | Hasegawa et al. |
| 2009/0314161 | A1 | 12/2009 | Al-Alusi et al. |
| 2010/0107647 | A1 | 5/2010 | Bergen |
| 2010/0180854 | A1 | 7/2010 | Baumann et al. |
| 2011/0038707 | A1 | 2/2011 | Blackstone |
| 2011/0266811 | A1 | 11/2011 | Smadja |
| 2012/0051908 | A1 | 3/2012 | Irvin, Sr. |
| 2014/0183144 | A1 * | 7/2014 | Irvin, Sr. .......... C02F 1/38 210/788 |
| 2014/0224722 | A1 | 8/2014 | Irvin, Sr. |
| 2015/0144478 | A1 | 5/2015 | Irvin, Sr. |
| 2016/0228797 | A1 * | 8/2016 | Irvin, Sr. .......... C02F 1/38 |
| 2016/0257220 | A1 | 9/2016 | Irvin, Sr. et al. |

FOREIGN PATENT DOCUMENTS

| | | |
|---|---|---|
| EP | 1770717 A1 | 4/2007 |
| GB | 1187632 | 4/1970 |
| GB | 1262961 | 2/1972 |
| JP | 2009293984 A | 11/2009 |
| SU | 1625829 A1 * | 2/1991 |
| WO | 2004112938 A1 | 12/2004 |
| WO | 2008054131 A1 | 5/2008 |
| WO | 2009010248 A2 | 1/2009 |
| WO | 2009024154 A1 | 2/2009 |
| WO | WO 2013130901 A1 * | 9/2013 ............ B04C 5/08 |

OTHER PUBLICATIONS

Coats, Callum, "Living Energies," 2001, pp. 107-117, 156-192, 197-200, and 275-293.
Schauberger, Viktor, translated and edited by Callum Coats, "The Energy Evolution: Harnessing Free Energy from Nature," vol. 4 of the Eco-Technology Series, Mar. 2001, pp. 9-28, 62-63, 104-113, 130-142, 164-195, and 200-203.
Schauberger, Viktor, translated and edited by Callum Coats, "The Fertile Earth: Nature's Energies in Agriculture, Soil Fertilisation and Forestry," vol. Three of Eco-Technology Series, Mar. 2001, pp. 26-29, 39-43, 18-50, 57-68, and 72-74.
GuardianTrader, Genesis Vortex, http://guardiantrader.com/Genesis_Vortex.html, printed Jul. 12, 2011.
Natural Energy Works, "Wasserwirbler (Water Vortex Shower)", http://www.orgonclab.org/cart/yvortex.htm, printed Jul. 12, 2011.
Wikipedia, "Tesla Turbine," http://en.wikipedia.org/wiki/Tesla_turbine, printed Mar. 23, 2010.
Jens Fischer, "Original Martin-Wirbelwasser", http:fischer-wirbelwasser.de/Schauberger/schauberger.html, printed Jul. 12, 2011.
Wirbelwasser, "Was ist Wirbelwasser?", http://fischer-wirbelwasser.de/Wasserwirbler/Was_ist_Wirbelwasser/body_was_ist_wirbelwasser.html, printed Jul. 12, 2011.
Espacenet, English Abstract for JP2009293984 (A), printed Mar. 14, 2013.
Fractal Water, LLC, "Structured water is Fractal Water's Implosion nozzle Vortex", copyrighted 2012, printed on Dec. 28, 2012 from http://www.fractalwater.com/vortex/.
Fractal Water, LLC, "Magnetic Water Treatment with the Fractal Water Super Imploder Magnetics", copyrighted 2012, printed on Dec. 28, 2012 from http://www.fractalwater.com/magnetics/.
Fractal Water, LLC, "Fractal Water: Vortex Magnetic Systems:: Physics of the Imploder Vortex Nozzle", copyrighted 2012, printed on Dec. 28, 2012 from http://www.fractalwater.com/science/physics-of-the-imploder-vortex-nozzle/.
Fractal Water, LLC, "Buy the Super Imploder from Fractal Water, Vortex Magnetic System", copyrighted 2012, printed on Dec. 28, 2012 from http://www.fractalwater.com/products/imploder-magnetic-water/.
Fractal Water, LLC, "Implosion water structured vortex", copyrighted 2012, printed on Dec. 28, 2012 from http://www.fractalwater.com/products/tri-ploder-vortex/.
Fractal Water, LLC, "Fractal Water: Vortex Magnetic Systems :: Imploder Vortex Shower Head", copyrighted 2012, printed on Dec. 28, 2012 from http://www.fractalwater.com/products/imploder-vortex-shower-head/.

* cited by examiner

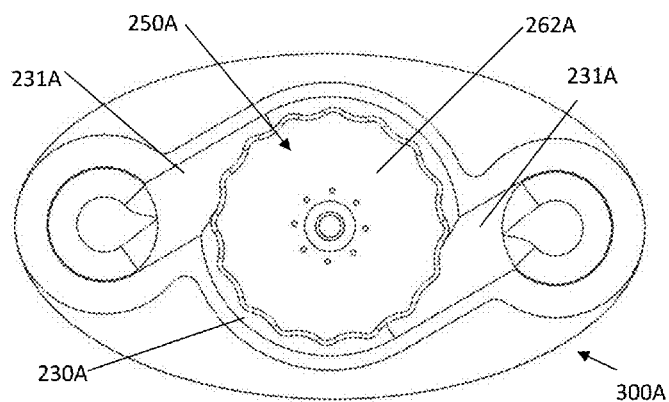
FIG. 7D
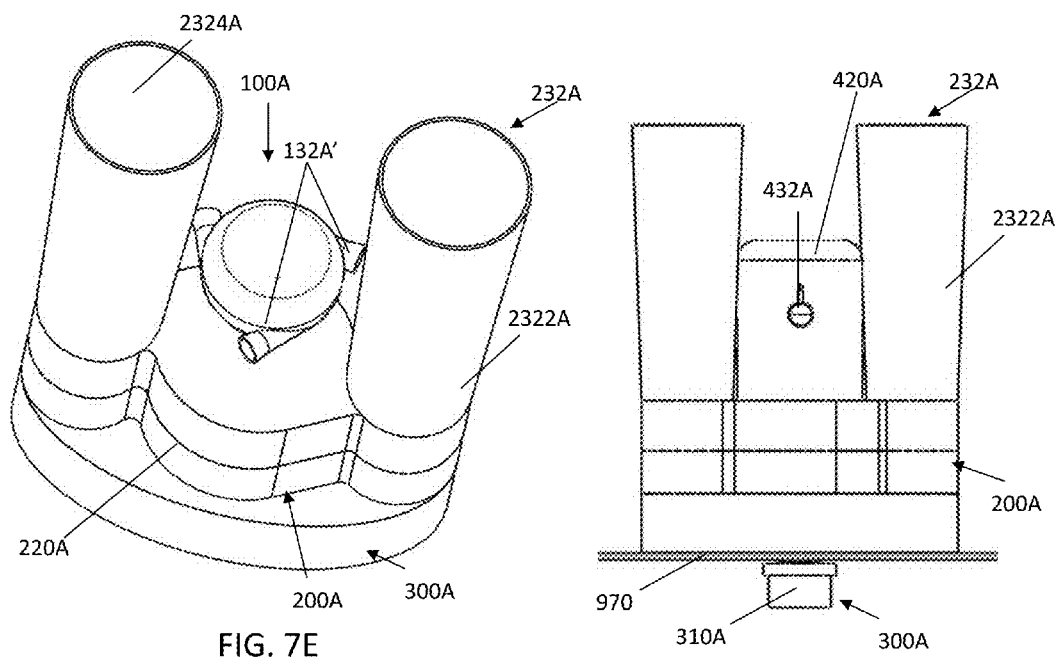
FIG. 7E
FIG. 7F

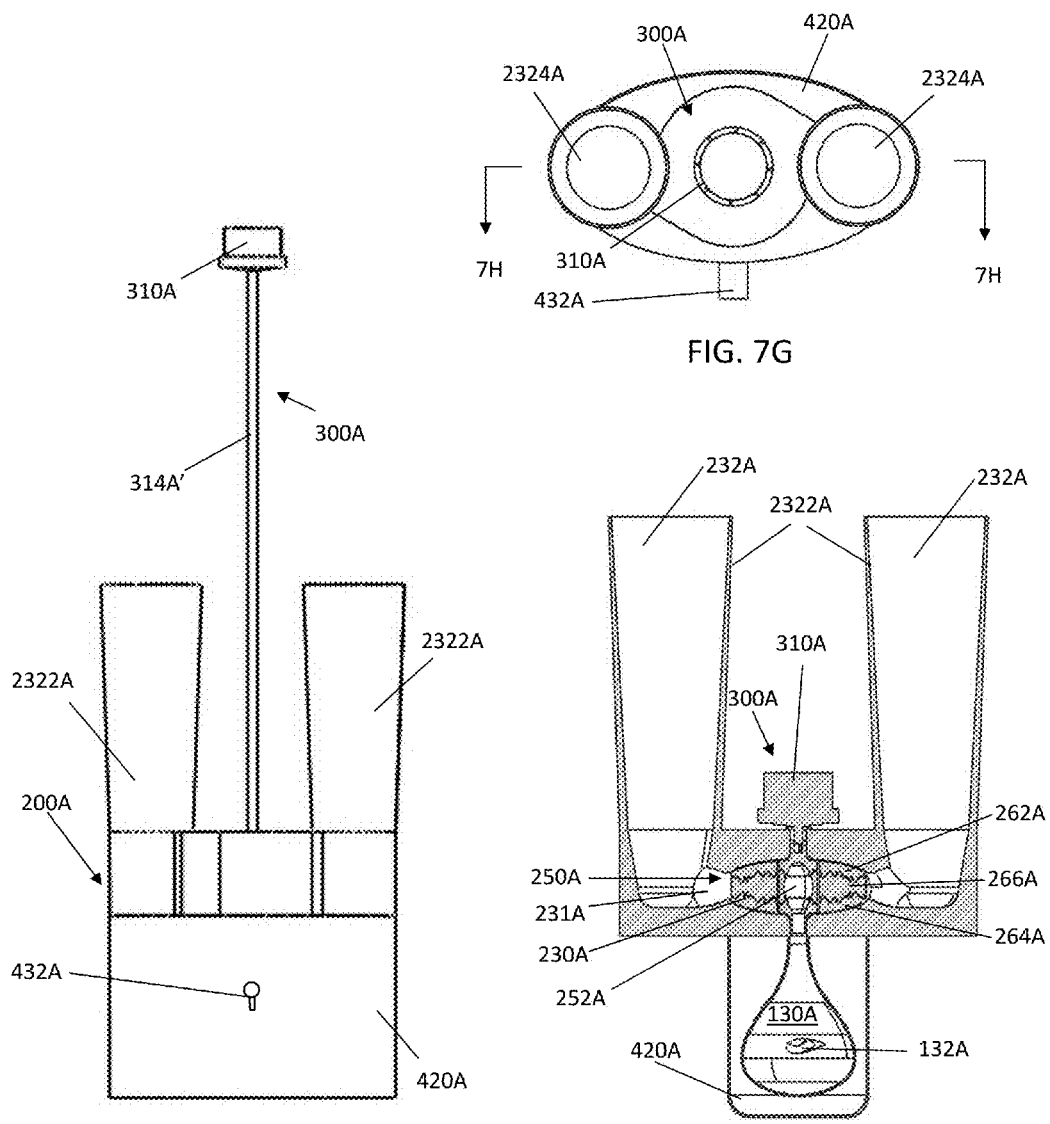

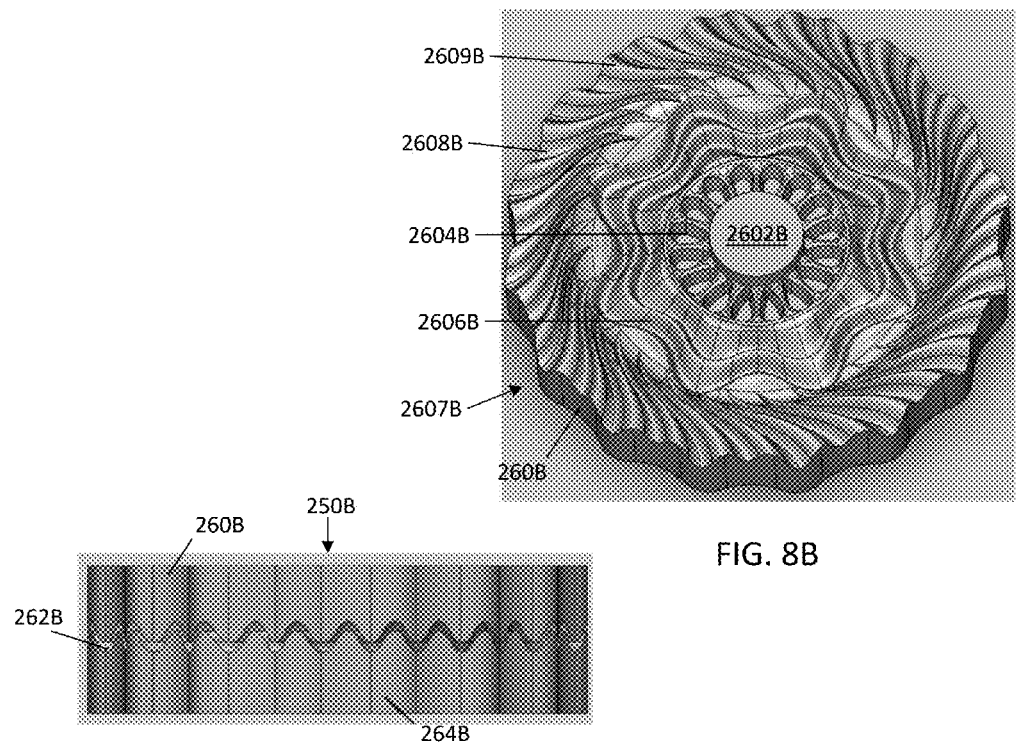
FIG. 8B
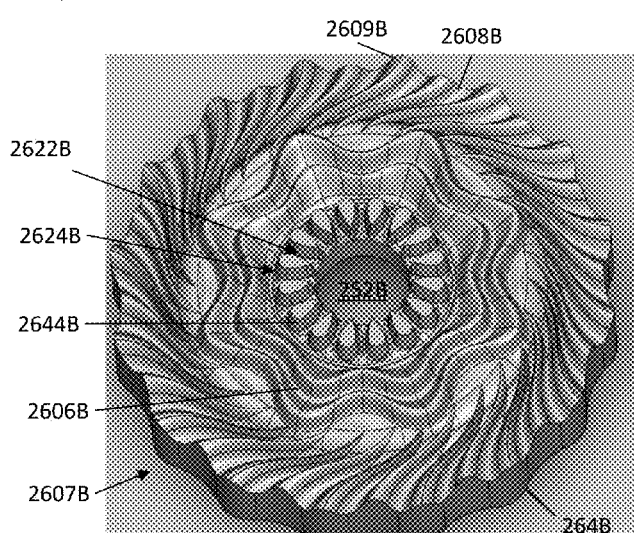
FIG. 8A
FIG. 8C

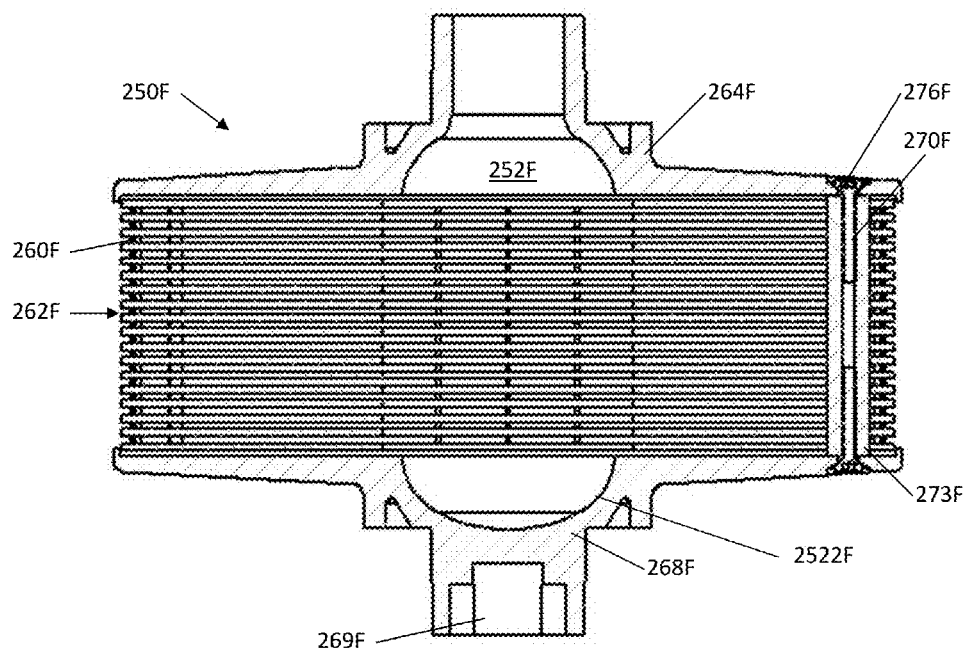
FIG. 11C
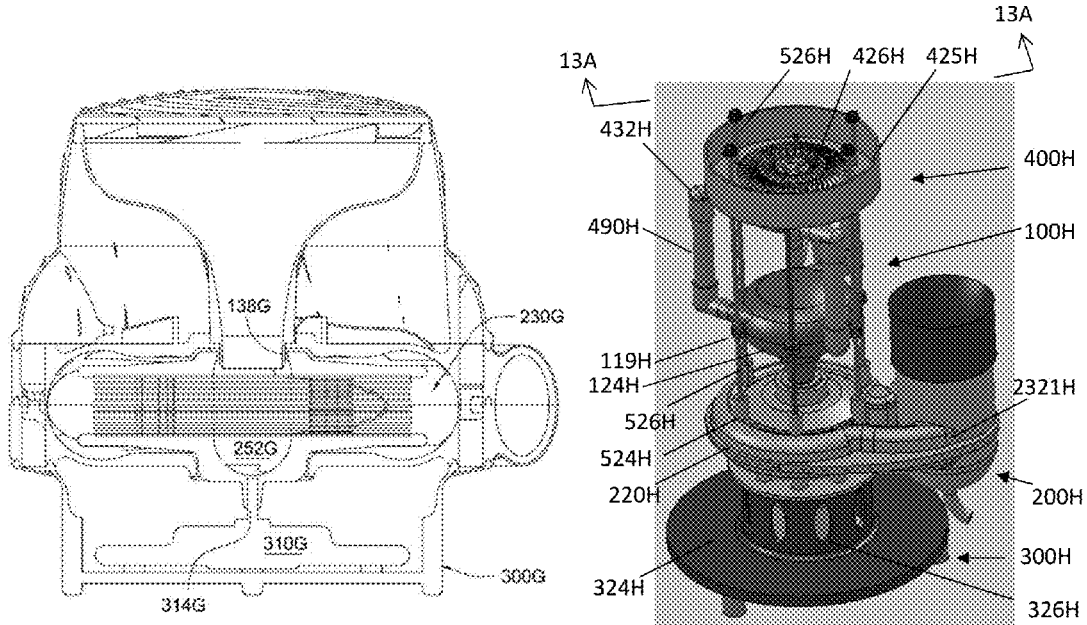
FIG. 12B
FIG. 13B ures.
DESALINATION AND/OR GAS PRODUCTION SYSTEM AND METHOD This application is a continuation of PCT Application No. PCT/US2013/028449, filed Feb. 28, 2013, which claims the benefit of U.S. provisional Application Ser. No. 61/604,482, filed Feb. 28, 2012, and entitled Gas Production and Collection System and Method; and U.S. provisional Application No. 61/700,475, filed Sep. 13, 2012, and entitled Desalination System and Method, which are all hereby incorporated by reference.

I. FIELD OF THE INVENTION

The present invention relates to a system and method in at least one embodiment for collecting gas that is out gassed as part of a water treatment process. In another embodiment, the present invention relates to a desalination system and method.

II. SUMMARY OF THE INVENTION

In at least one embodiment according to the invention, a system includes a water intake; a gasification unit having a plurality of water treatment systems and a cavity in fluid communication with the intake; a chiller/condenser unit in fluid communication with the gasification unit such that at least a portion of the gas expelled from the plurality of water treatment systems is received by the chiller/condenser unit; and a salt water discharge in fluid communication with the gasification unit. In at least one embodiment according to the invention, there is a method for the operation of such a system.

In at least one embodiment, the invention includes a system for producing and collecting gas including: a water tank; a hood engaging the water tank, the hood including at least one port; at least one water dissociation system in the water tank, the water treatment system including a motor, a driveshaft engaging the motor, a vortex module having a housing; a plurality of inlets spaced around the periphery of the housing near a top of the housing; and a vortex chamber formed in the housing and in fluid communication with the plurality of inlets, and a disk-pack module having a housing having a discharge chamber formed in the disk-pack housing, and the discharge chamber having a plurality of discharge ports providing a fluid pathway from the discharge chamber to outside of the disk-pack housing; and a disk-pack having an expansion chamber formed in an axial center and in fluid communication with the vortex chamber, the disk-pack having a plurality of spaced apart disks providing passageways between the expansion chamber and the discharge channels (or passageways in fluid communication with at least two vertical discharge outlets, the disk-pack engaging the driveshaft.

The invention in at least one embodiment includes a system including: a water intake; a processing unit having a plurality of water dissociation systems and a cavity in fluid communication with the water intake; a chiller/condenser unit in fluid communication with the processing unit such that at least a portion of the gas expelled from the plurality of water treatment systems is received by the chiller/condenser unit; and a water discharge in fluid communication with the processing unit.

In a further embodiment to the above embodiments, the system further includes a salinity meter for determining the increase in salinity present in salt water in the cavity of the processing unit; at least one pump in-line with the pathway of salt water flow through the system; and a control unit electrically connected to the salinity meter and the pump to control the operation of the pump at least in part on readings received from the salinity meter. In a further embodiment to any of the above embodiments, the system further includes a pretreatment tank having at least one water processing system and a cavity in fluid communication between the water intake and the processing unit. In a further embodiment to any of the above embodiments, the system further includes a post process tank having at least one water processing system and a cavity in fluid communication between the processing unit and the salt water discharge. In a further embodiment to any of the above embodiments, the system further includes a water collection tank for receiving condensation produced by the chiller/condenser unit. In a further embodiment to any of the above embodiments, the system further includes a gas capture system. In a further embodiment, the gas capture system has at least one gas separation membrane and at least two discharge ports for receiving gas streams separated by the at least one gas membrane. In a further embodiment, the gas capture system further has at least one storage tank in fluid communication with at least one of the two discharge ports. In a further embodiment to the previous three embodiments, the gas capture system is in the gas flow between the processing unit and the chiller/condenser unit such that the gas capture system provides separated Oxygen and Hydrogen gases to the chiller/condenser unit. In a further embodiment to any of the above embodiments, the system further includes a reservoir containing water.

In a further embodiment to any of the above embodiments, the water dissociation system has a vortex chamber, a disk-pack turbine in fluid communication with the vortex chamber and the disk-pack turbine having a plurality of disks with each pair of disks having at least one chamber between them, at least one discharge outlet in fluid communication with the chambers in disk-pack turbine, and a drive system in rotational engagement with the disk-pack turbine. In an alternative embodiment to the previous embodiment the water dissociation system has a motor; a driveshaft engaging the motor; a vortex module having a housing, a plurality of inlets spaced around the periphery of the housing near a top of the housing, and a vortex chamber formed in the housing and in fluid communication with the plurality of inlets; and a disk-pack module having a housing having at least one discharge channel, a plurality of discharge outlets providing a fluid pathway from the at least one discharge channel to outside of the disk-pack housing, and a disk-pack having an expansion chamber formed in an axial center and in fluid communication with the vortex chamber, the disk-pack having a plurality of spaced apart disks providing passageways between the expansion chamber and the at least one discharge channel, the disk-pack engaging the driveshaft.

The embodiments of this paragraph may be used in connection with any of the above embodiments. The invention in at least one embodiment includes a water dissociation system including: a vortex housing having a vortex chamber; a disk-pack module having a housing defining a chamber, a disk-pack turbine within the chamber and in fluid communication with the vortex chamber, at least two discharge channels extending away from the chamber, and at least two discharge outlets, each in fluid communication with one of the discharge channels; and a drive system module engaging the disk-pack turbine. In a further embodiment, the system further includes a cover over the vortex housing, and at least one valve passing through the cover;

and wherein the vortex housing having a plurality of vortex inlets in fluid communication with the vortex chamber. In a further embodiment, the system further includes a controller electrically connected to the at least one valve. In a further embodiment to any of the embodiments in this paragraph, each discharge outlet extends up from the housing of the disk-pack module and is taller than the vortex housing and/or includes a cavity that flares out from the discharge channel. In a further alternative embodiment to any of the embodiments in this paragraph, the vortex chamber is above the disk-pack turbine and the drive system module. In a further embodiment, the drive system module includes a motor and a driveshaft connecting the motor to the disk-pack turbine. In a further embodiment, the driveshaft passes through a barrier external to the system. In a further alternative embodiment to any of the embodiments in this paragraph, the motor module is above the disk-pack turbine and the vortex chamber is below the disk-pack turbine. In a further embodiment to any of the embodiments in this paragraph, the drive system module includes a motor and a driveshaft connecting the motor to the disk-pack turbine. In a further embodiment to any of the embodiments in this paragraph, the driveshaft passes through a barrier external to the system. In a further embodiment to any of the embodiments in this paragraph, the disk-pack turbine includes a first disk having an axially centered opening passing therethrough, a second disk, and at least one middle disk; and wherein each of the first disk, the second disk, and the at least one middle disk includes a set of waveforms and a plurality of vanes having channels and ridges where the set of waveforms and the plurality of vanes are centered about the opening of the first disk.

The embodiments of this paragraph may be used in connection with any of the above embodiments. The invention in at least one embodiment includes a disk-pack turbine including: a first disk having an axially centered opening passing therethrough, and a second disk; and wherein each of the first disk and the second disk includes a set of waveforms and a plurality of vanes having channels and ridges where the set of waveforms and the plurality of vanes are centered about the opening of the first disk. In a further embodiment, one of the first disk and the second disk includes a plurality of vertical members spaced around the axial center of the disk, and the other of the first disk and the second disk includes a plurality of recesses, each of which receives one of the vertical members. In a further embodiment, the vertical members are aligned with a radius extending from the center of the disk. In a further embodiment to either of the previous embodiments, between neighboring vertical members at least one of a convergent channel and a divergent channel is formed. In a further embodiment to any of the embodiments in this paragraph, a width of the channels of the vanes increases at the channel approaches a periphery of the first disk or the second disk. In a further embodiment to any of the embodiments in this paragraph, the channels are curved along their length. In a further embodiment to any of the embodiments in this paragraph, the channels each include an S-curve. In a further embodiment to any of the embodiments in this paragraph, the set of waveforms includes hyperbolic waveforms.

The invention in at least one embodiment includes a method of producing gas from water (or another liquid) including: filling a water tank with water sufficient to cover any inlet and any discharge of a water treatment system present in the water tank; rotating a disk-pack turbine in a disk-pack module of the water treatment system; spinning a water to create a vortex where the water that enters the vortex is located inside the water tank; discharging the water from the vortex module into an expansion chamber formed in the disk-pack turbine of the disk-pack module; channeling and distributing the water between spaces that exist between disks of the disk-pack turbine to travel from the expansion chamber to at least one discharge channel surrounding the disk-pack turbine; flowing water in the discharge channel to at least one discharge port; and collecting gas with a hood that is out gassed from the water as the water is discharged from the water treatment system.

The invention in at least one embodiment includes a method for production of substantially fresh water from salt water including: placing water into a processing tank such that the water level is sufficient to cover any inlet and any discharge of any water dissociation system present in the processing tank; operating each of the water dissociation systems in the processing tank by rotating a disk-pack turbine in a disk-pack module of each of the water treatment systems; spinning a water to create a vortex where the water that enters the vortex is located inside the processing tank; discharging the water from the vortex module into an expansion chamber formed in the disk-pack turbine of the disk-pack module; channeling the water between spaces that exist between disks of the disk-pack turbine to travel from the expansion chamber to at least one discharge channel surrounding the disk-pack turbine; discharging the water through at least one discharge outlet; and collecting gas through a port proximate a top of the processing tank; routing the collected gas into a chiller/condenser unit to produce substantially fresh water.

In a further embodiment to any of the above method embodiments, the system substantially performs all of the steps when the disk-pack turbines are rotating. In a further embodiment to any of the above method embodiments, the method further includes adjusting a speed of rotation of the disk-pack turbines during operation. In a further embodiment to any of the above method embodiments, the method further includes routing the gas from the processing tank to a gas capture system; and separating the gas into at least two separate gas flows with the gas capture system. In a further embodiment to any of the above method embodiments, placing water into the processing tank includes circulating water through the processing tank. In a further embodiment to any of the above method embodiments, the method further includes controlling the rate of circulation of salt water at least in part based on a salinity reading from a salinity sensor to maintain the salt water being discharged from the processing tank within predetermined salinity threshold above the salt water source. In a further embodiment to any of the above method embodiments, the method further includes routing the retentate stream from a gas capture system in fluid communication with the processing tank. In a further embodiment to any of the above method embodiments, the method further includes providing at least two separated gas flows from the gas capture system to the chiller/condenser unit.

III. BRIEF DESCRIPTION OF THE DRAWINGS

The present invention is described with reference to the accompanying drawings. In the drawings, like reference numbers indicate identical or functionally similar elements. The use of cross-hatching and shading within the drawings is not intended as limiting the type of materials that may be used to manufacture the invention.

FIGS. 4 and 5 illustrate a partial cross-sections taken at 4-4 in FIG. 3.

FIG. 6 illustrates a top view.

Figure 7A:
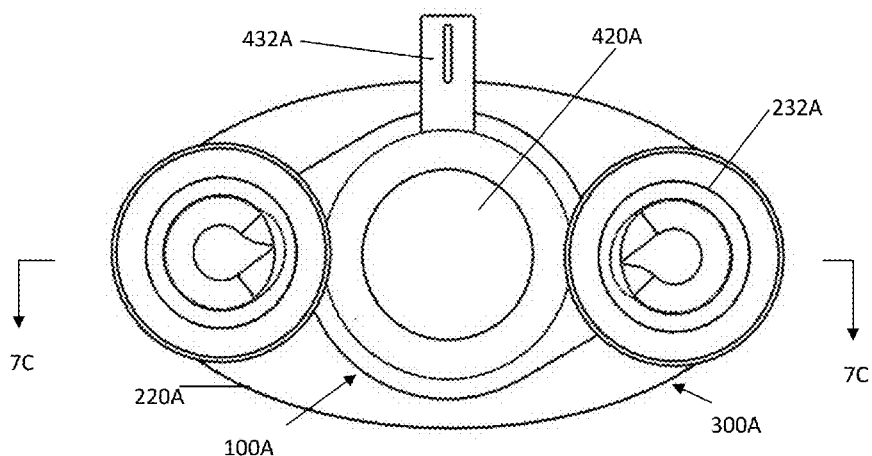
Figure 7B:
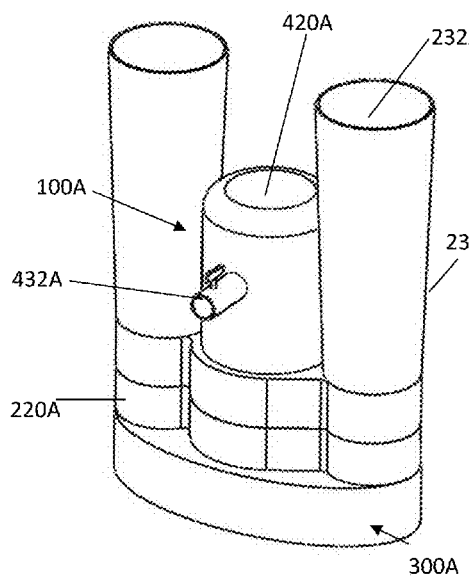
Figure 7C:
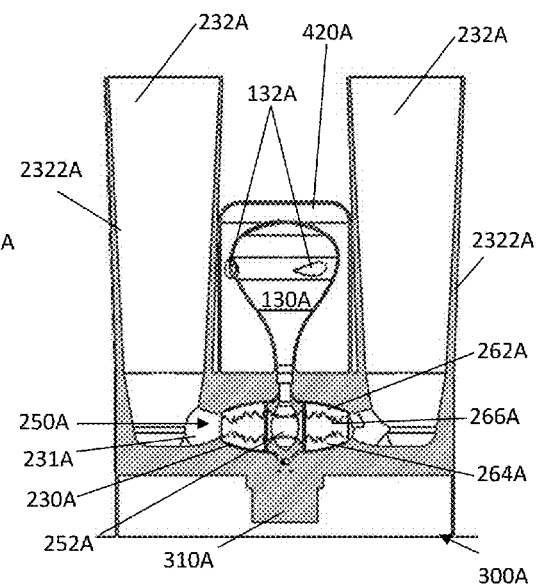

FIG. 7A-7I illustrates a water processing system embodiment according to the invention. FIG. 7A illustrates a top view of the embodiment. FIG. 7B illustrates a perspective view of the embodiment. FIG. 7C illustrates a cross-section taken at 7C-7C in FIG. 7A. FIG. 7D illustrates a top view of a portion of the embodiment. FIG. 7E illustrates a perspective view of an alternative embodiment. FIG. 7F illustrates a side view of another configuration of the embodiment. FIG. 7G illustrates a top view of another configuration of the embodiment with FIG. 7H illustrating a cross-section taken at 7H-7H in FIG. 7G. FIG. 7I illustrates a side view of another configuration of the embodiment.

FIGS. 8A-8C illustrate an example of another disk-pack turbine for use in the various water processing system examples in this disclosure.

Figure 9A:
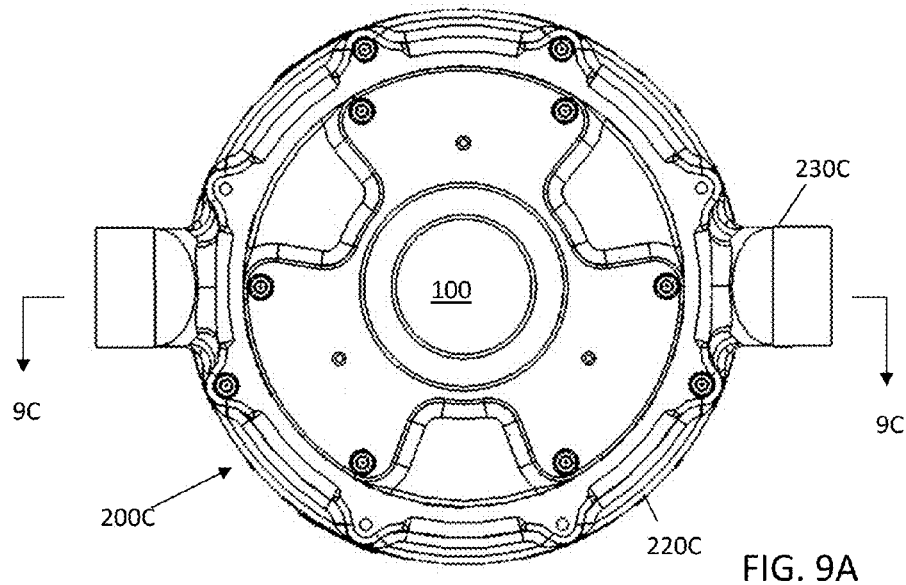
Figure 9B:
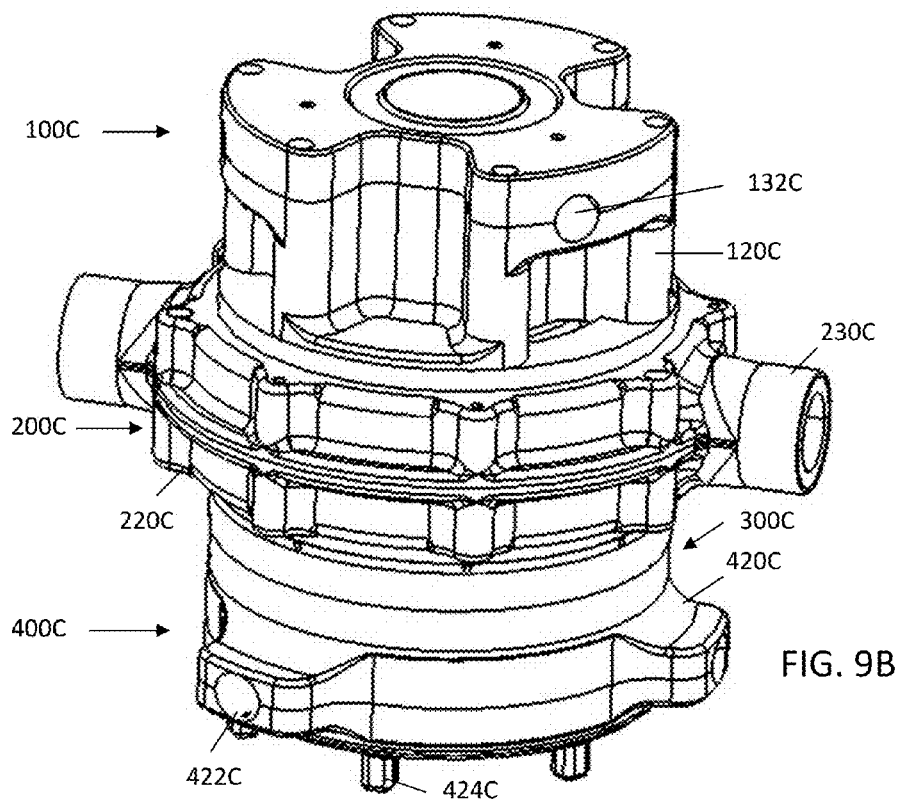
Figure 9C:
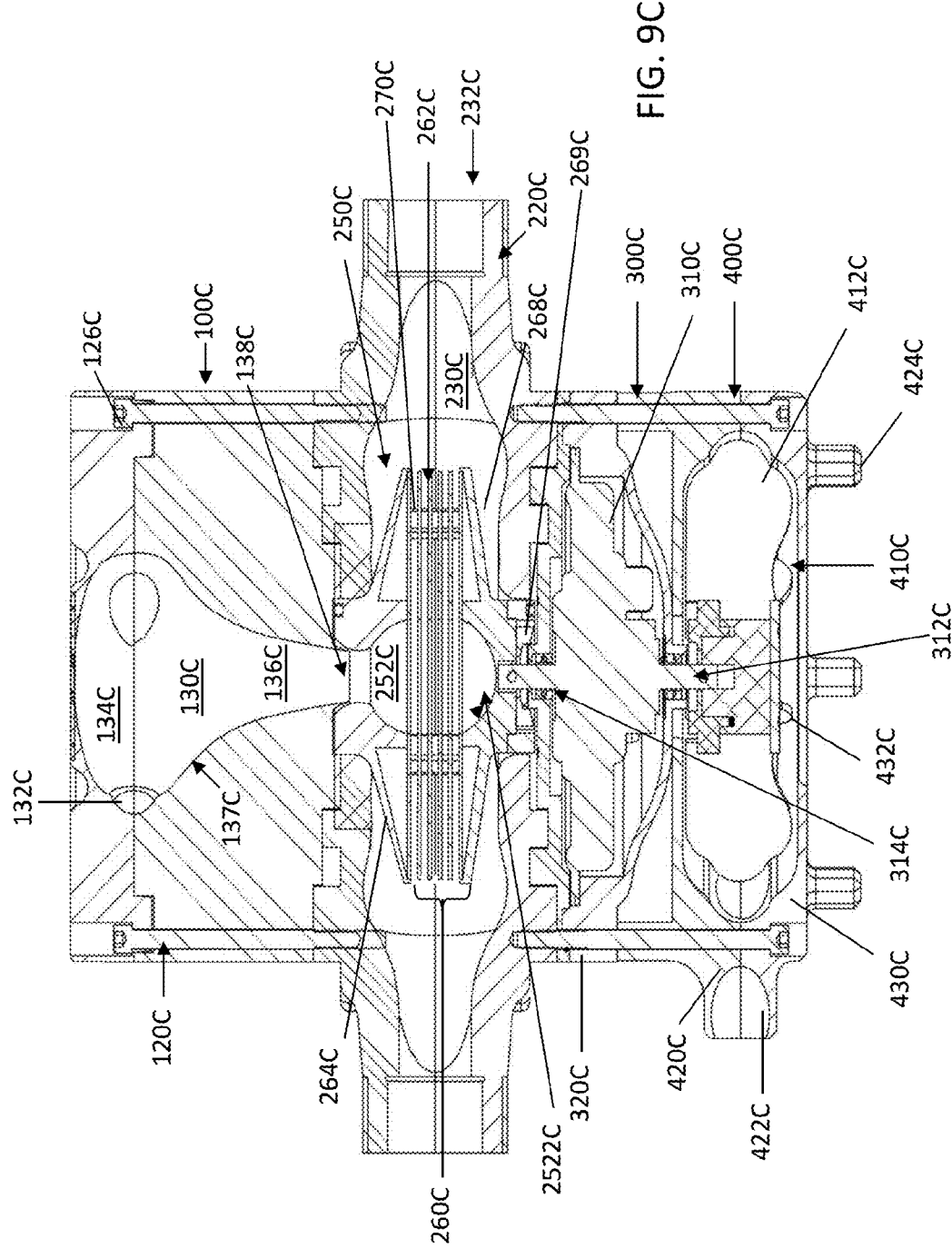

FIGS. 9A-9C illustrate a first example water processing system for use in at least one embodiment according to the invention. FIG. 9A illustrates a top view. FIG. 9B illustrates a perspective view. FIG. 9C illustrates a cross-section taken at 9C-9C in FIG. 9A.

Figure 10A:
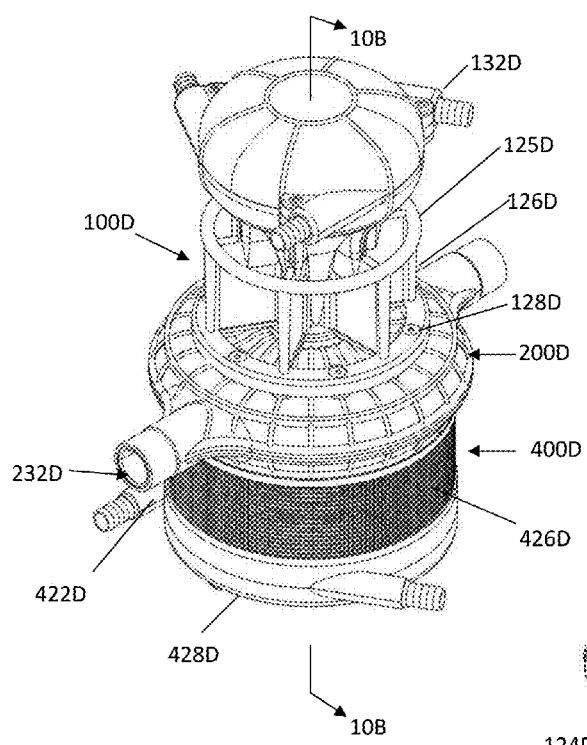
Figure 10B:
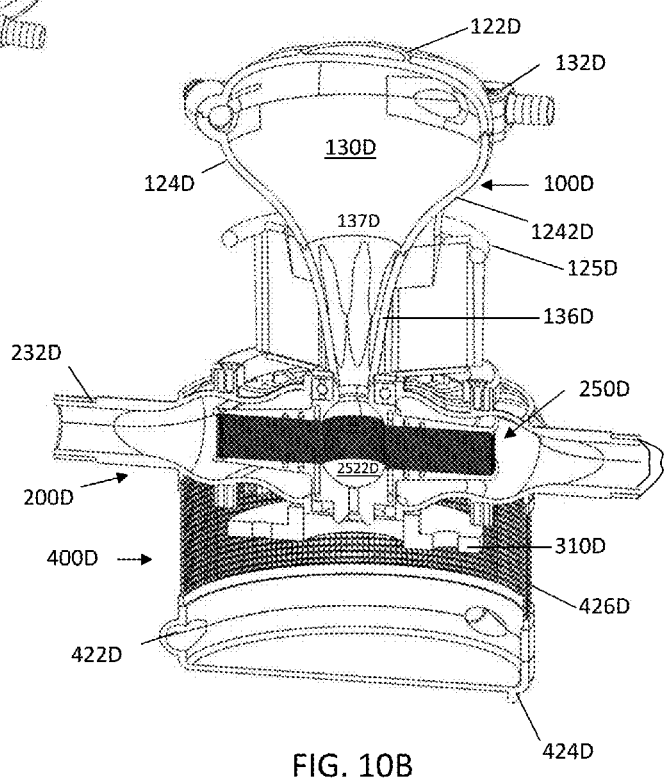

FIGS. 10A and 10B illustrate a second example water processing system for use in at least one embodiment according to the invention. FIG. 10A illustrates a perspective view. FIG. 10B illustrates a cross-section taken at 10B-10B in FIG. 10A.

Figure 11A:
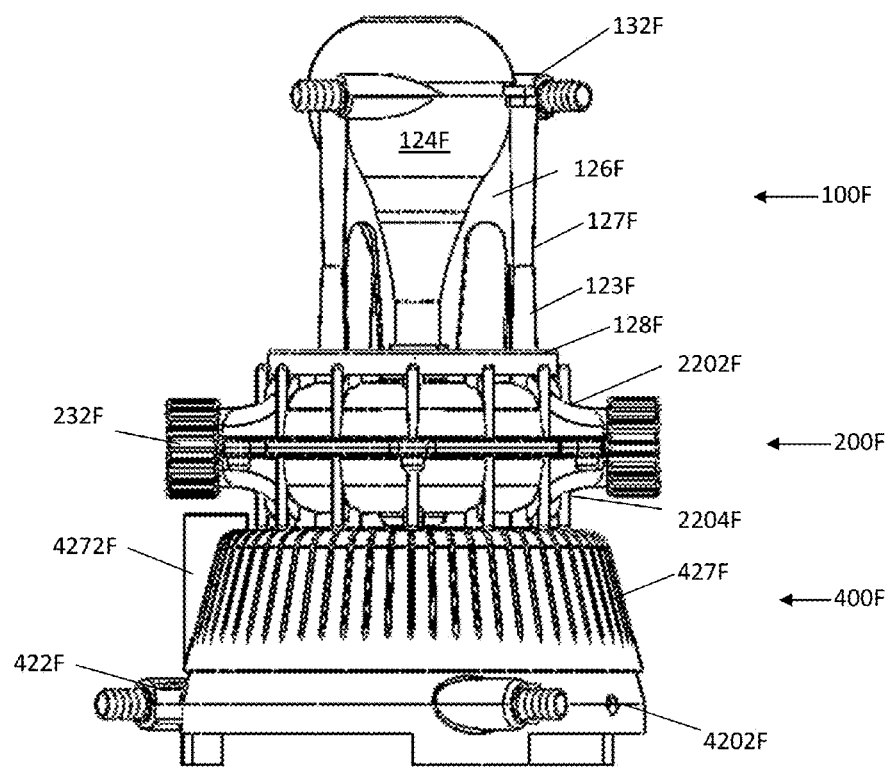
Figure 11B:
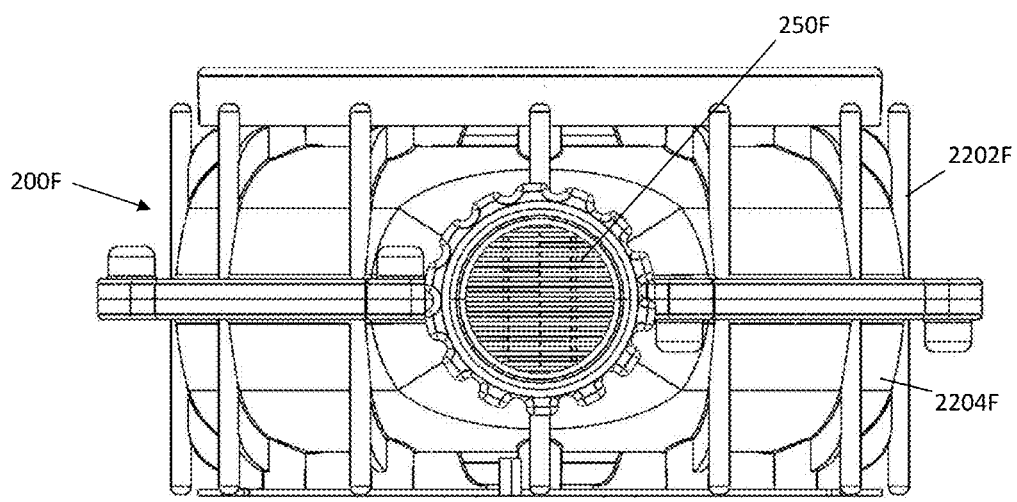

FIGS. 11A-11C illustrate a third example water processing system for use in at least one embodiment according to the invention. FIGS. 11A and 11B illustrate side views. FIG. 11C illustrates a cross-section taken along a diameter of a disk-pack turbine.

Figure 12A:
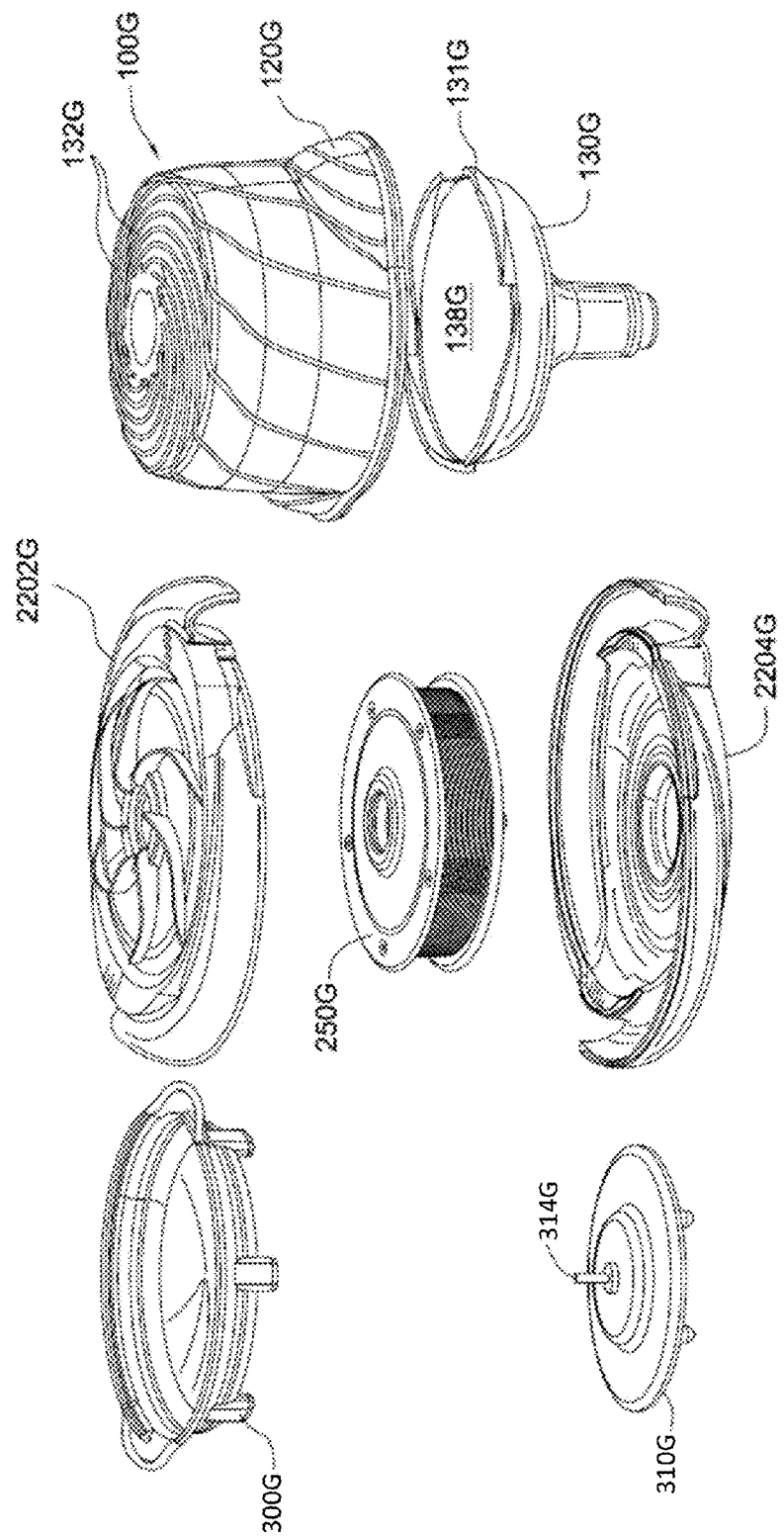

FIG. 12A illustrates an exploded view of a fourth example water processing system for use in at least one embodiment according to the invention. FIG. 12B illustrates a cross-section of the embodiment illustrated in FIG. 12A.

Figure 13A:
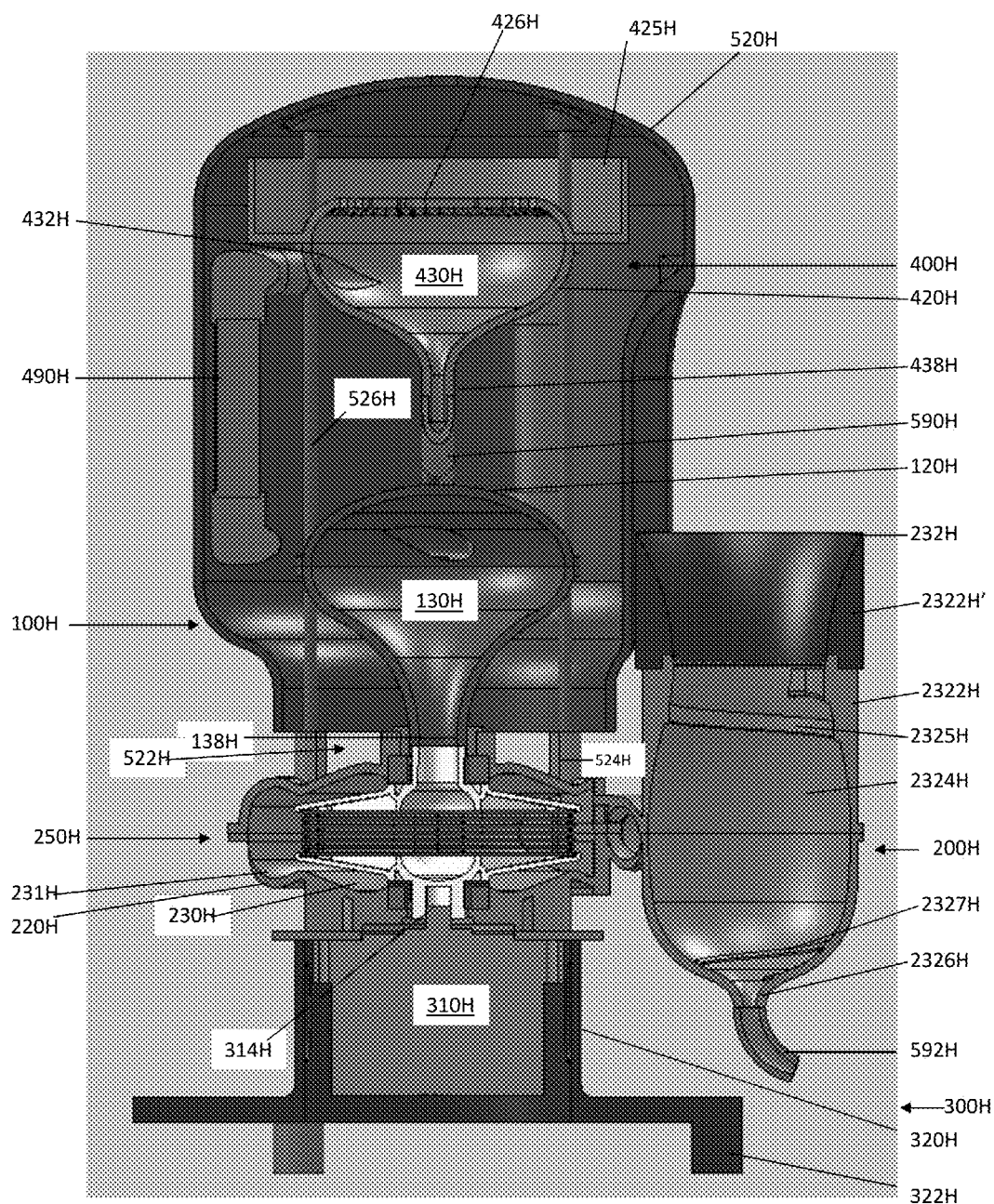

FIGS. 13A and 13B illustrate a fifth example water processing system for use in at least one embodiment according to the invention. FIG. 13A illustrates a cross-section taken at 13A-13A in FIG. 13B with the addition of a housing. FIG. 13B illustrates a perspective view.

Figure 14:
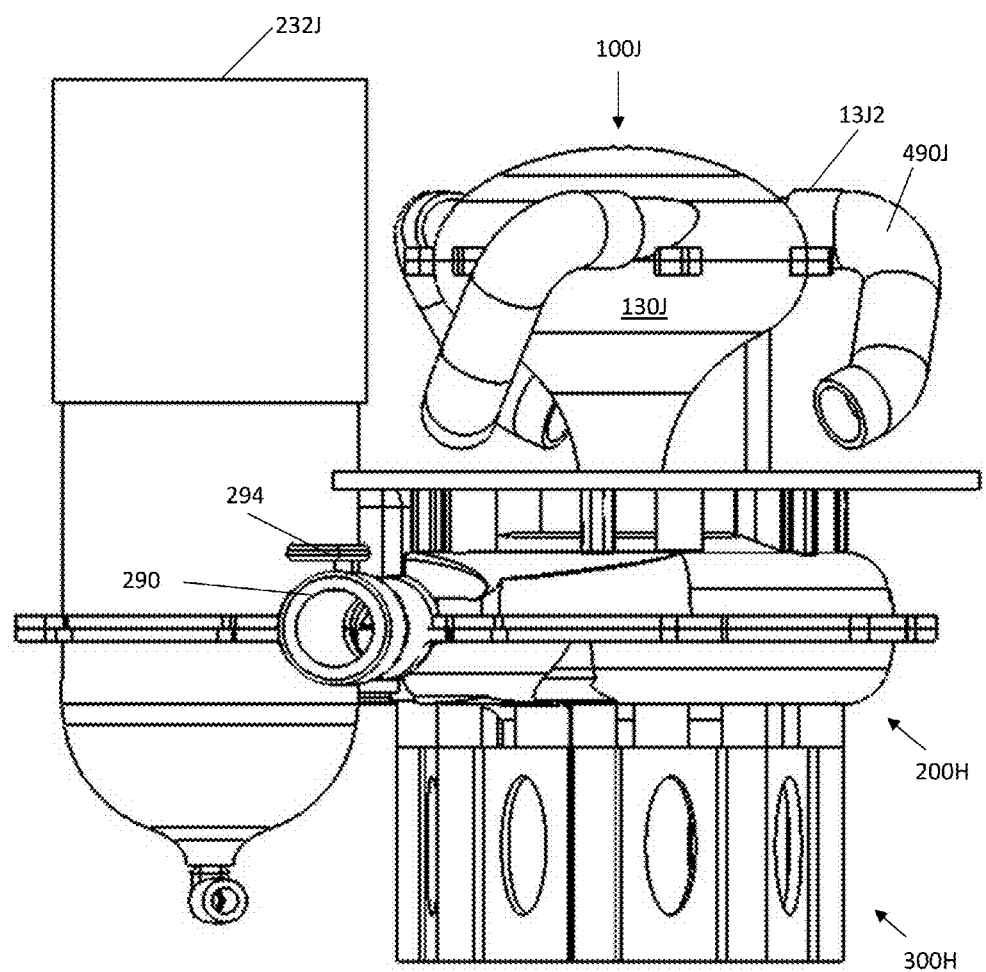

FIG. 14 illustrates a sixth water processing system for use in at least one embodiment according to the invention.

Figure 15:
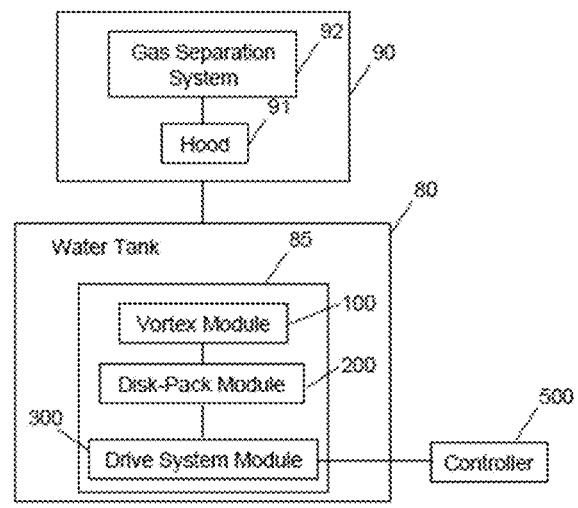
Figure 3:
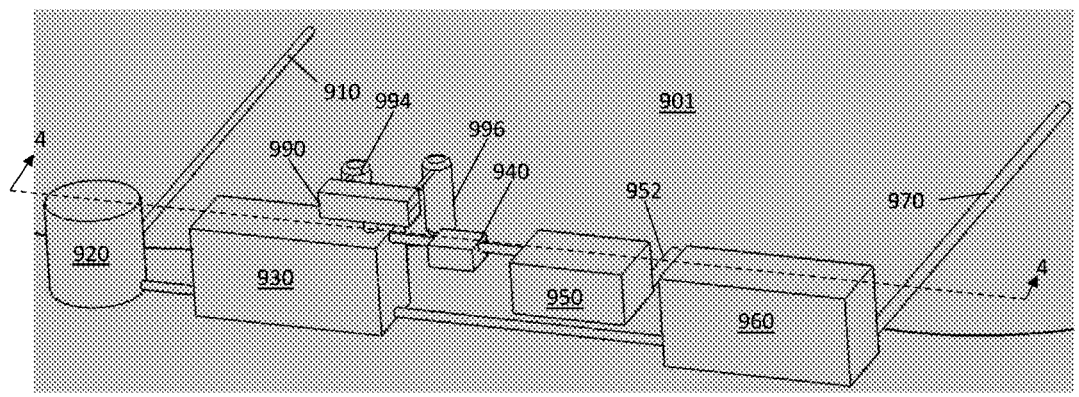
FIGS. 3-6 illustrate different views of a desalination embodiment according to the invention.

FIG. 15 illustrates a block diagram of an example of a controller for use in at least one embodiment according to the invention.

Figure 16:
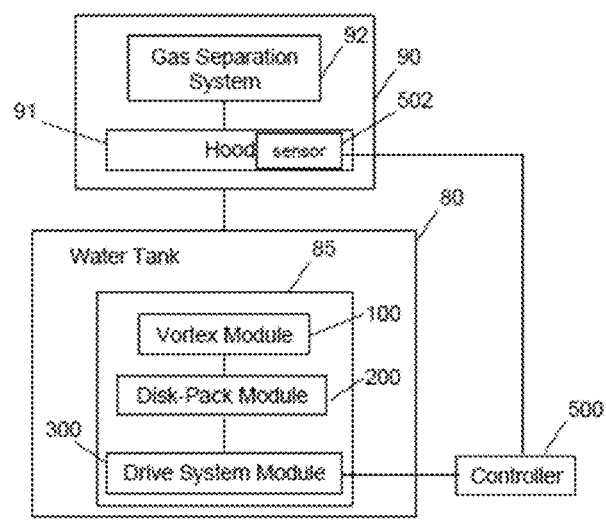

FIG. 16 illustrates another block diagram of an example of a controller for use in at least one embodiment according to the invention.

Figure 17A:
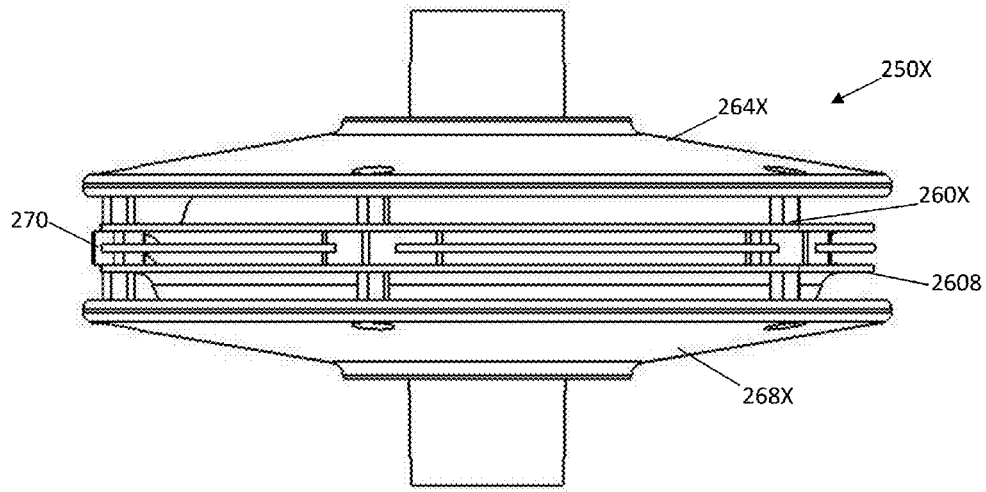
Figure 17B:
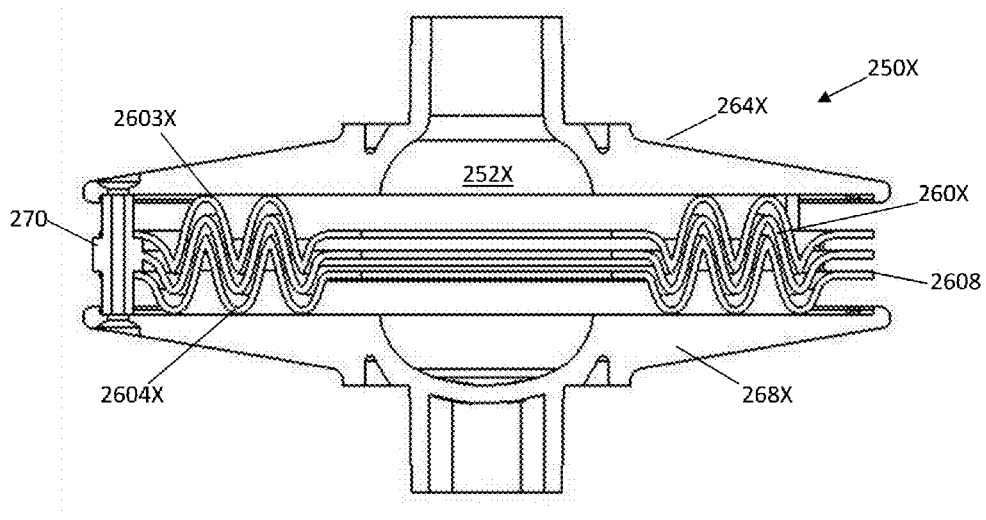

FIGS. 17A and 17B illustrate a waveform disk pack turbine example according to at least one embodiment of the invention.

FIGS. 18A-18E illustrate a waveform disk pack turbine example according to at least one embodiment of the invention.

Figure 19:
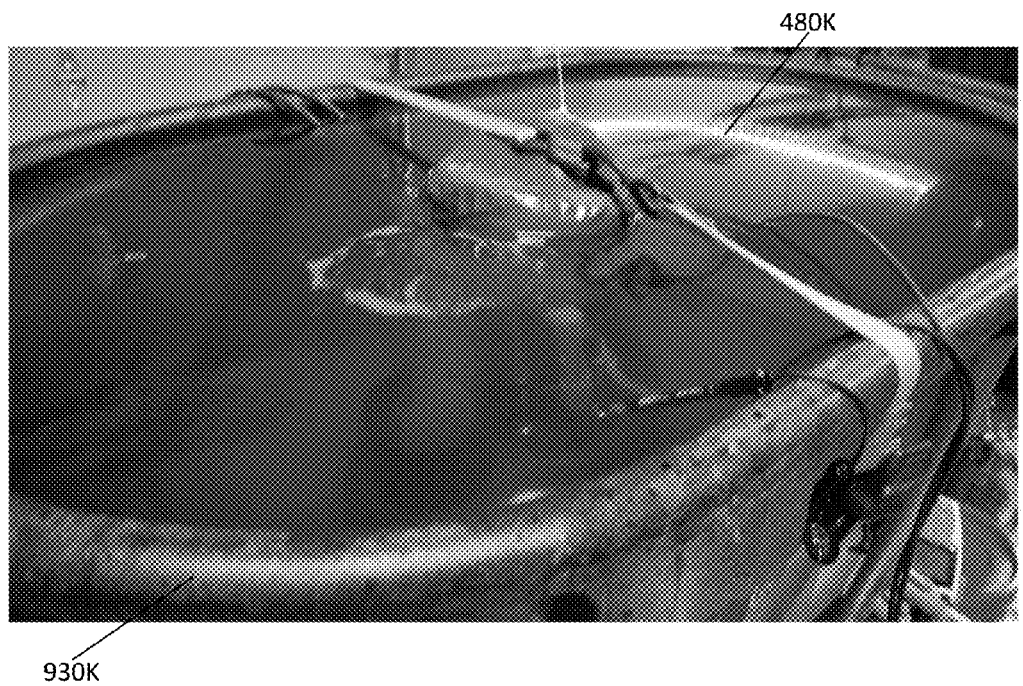
Figure 20A:
Figure 20B:
Figure 20C:
Figure 20D:
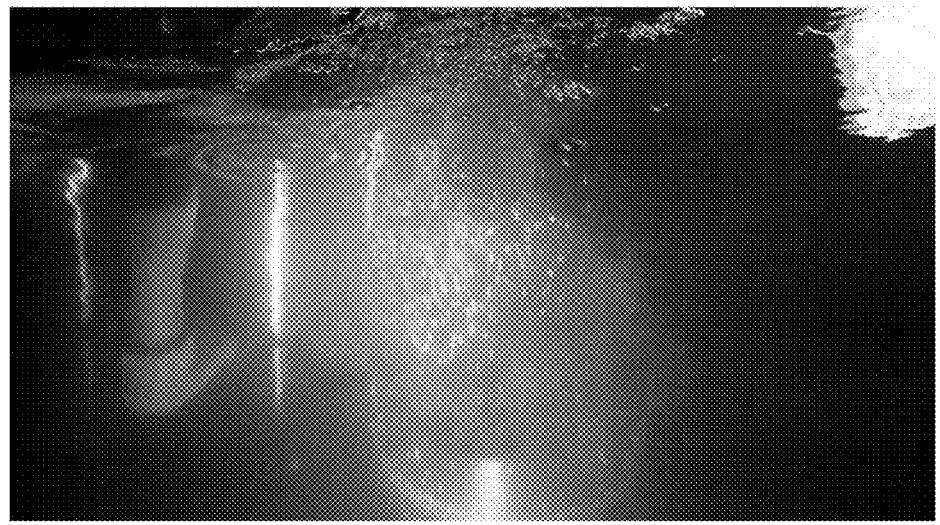
Figure 21A:
Figure 21B:
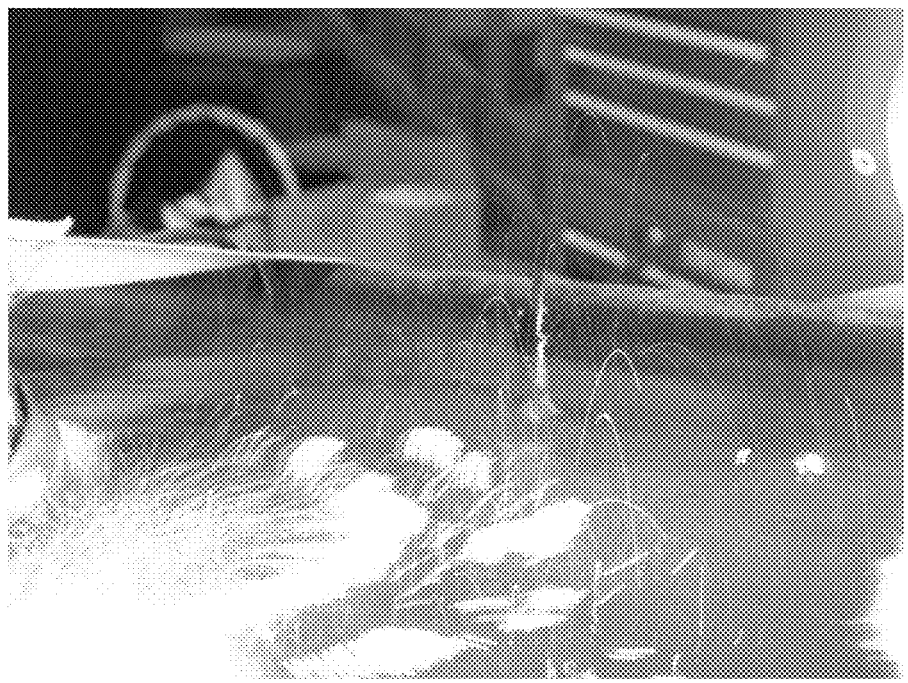
Figure 21C:
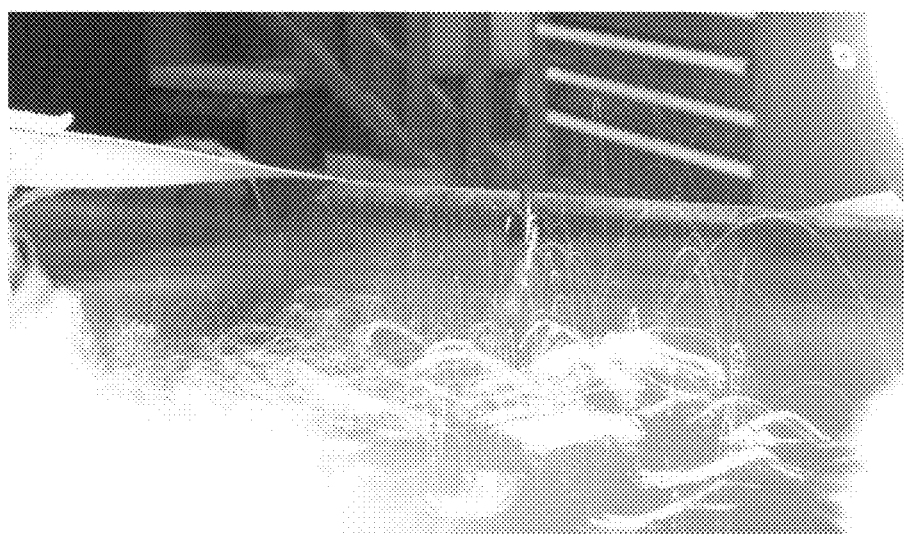

FIG. 19 illustrates the setup for a salt water experiment. FIGS. 20A-20D are images of the processing of the salt water. FIGS. 21A-21C are images of the water surface behavior during the processing of the salt water.

IV. DETAILED DESCRIPTION OF THE INVENTION

Figure 1:
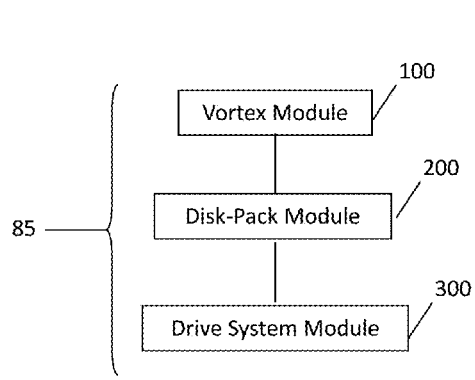
FIG. 1 illustrates an example block diagram of an example water processing system.
Figure 2:
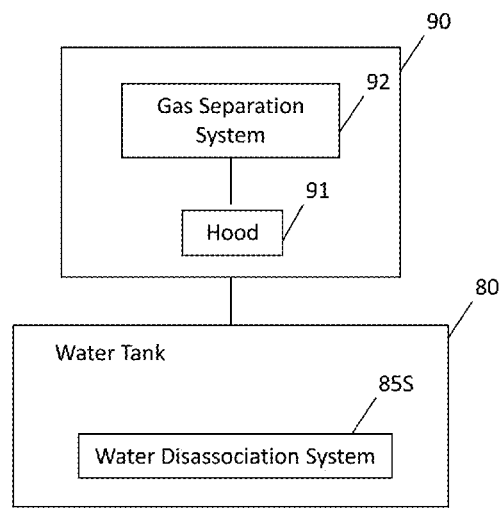
FIG. 2 illustrates a block diagram of an embodiment according to the invention.

According to at least one embodiment of the invention, a water processing system 85 having at least a vortex module 100, a disk-pack module 200, and a drive system module (or in some embodiments a motor module) 300 as illustrated in FIG. 1 placed in a water tank 80 and is used to generate the production of gases from water present in the water tank 80 to capture with a gas collection/separation system 90 as illustrated in FIG. 2, and in at least one further embodiment the Hydrogen and Oxygen gases present are condensed together to form water as illustrated by FIGS. 3-6. In an alternative embodiment, the water processing system 85 is turned upside down. In at least one embodiment, the water processing system is a water dissociation system directed at releasing gas from water and in other embodiments the water processing system is a water treatment system directed at, for example, increasing oxygenation in the water in at least one embodiment by allowing and encouraging released gas to be reassimilated into the water by the use, for example, of accumulation chambers and the like instead of attempting to quickly route the fluid and gas that exits from the disk-pack turbine out a discharge outlet.

FIGS. 7A-18E illustrate a variety of example water dissociation systems that include the modules illustrated in FIG. 1. The various example water dissociation systems include one of the following module arrangements but are not limited to: the vortex module, the disk-pack module, the drive system module, and optional intake module; the optional intake module, the vortex module, the disk-pack module, and the drive system module; the vortex module, the disk-pack module, and the drive system module; and the drive system module, the disk-pack turbine module, and the vortex module. In an alternative embodiment to the configurations where the drive system module is on the bottom, the drive system module is partially outside of the water tank. In further embodiments the drive system module and the intake module are combined together as one module. The disk-pack module 200 includes a disk-pack turbine that is rotated by the drive system module 300. The drive system module 300 in at least one embodiment includes a driveshaft driven by a motor. In an alternative example, the motor may indirectly drive the driveshaft with, for example, a belt or other linkage. Based on this disclosure, it should be appreciated that the various described filter iterations in this disclosure may be omitted when the water (or liquid) used to produce the gas has been filtered and/or includes minimal debris and other non-liquid material in the water.

FIG. 2 illustrates a block diagram having a water tank 80, a water dissociation system 85S, and a gas collection/separation system 90. The water tank 80 is filled with a level of water sufficient to submerge the water dissociation system 85S by at least an inch of water, and in some embodiments a portion of the drive system module is above the water surface. A hood (or similar cover) 91 of the gas collection/separation system 90 is placed over the water tank 80 to provide at least a snug fit between the hood 91 and the water tank 80, and in further embodiments to seal the hood 91 to the water tank 80 with, for example, the use of a sealing gasket such as a O-ring. In an alternative embodiment as will be discussed in connection with FIGS. 3-6, the hood 91 is incorporated as a ceiling in a water tank structure 80 that holds multiple water dissociation systems 85s where the gas separation system 92 is in fluid communication with the water tank structure 80.

An example method includes the following process. Starting the water dissociation systems 85 to start the out gassing process from the water (or other liquid). Collecting any gas out gassed from the water with the hood 91. Separating the gas into at least two component parts with a separation system 92 in fluid communication with the hood 91.

In at least one embodiment, the separation system 92 includes one or more permeable membranes paired with at least one collection port. An example of this structure is that above the hood there is a collection port followed by a permeable membrane to separate Hydrogen from the other gases and upstream of the permeable membrane is a collection port for the Hydrogen, and in a further embodiment a membrane to separate Oxygen is provided along with a collection port Oxygen. In other examples there are multiple separation levels. In a further embodiment, the air collected prior to the first permeable membrane (retentate stream) is recycled back into the space defined by the hood 91 and the water tank 80 to establish an air flow through the system to encourage movement of the released gas into the hood. In a further embodiment, the recycling system includes at least one pump to establish a higher pressure in the air flow through the system. Examples of a pump include but are not limited to vacuum pumps, positive displacements such as diaphragm type, rotary glands, and piston types. In at least one embodiment, a regulated minimal vacuum condition is maintained that keeps pace substantially with gas production. The suction side of the pump will draw in the differentiated gases through the selectively permeable membranes and the discharge side of the pump provides the first level of pressurization into receiving differentiated gas vessels, which then, via cycles, based on available accumulated gas volume in the first stage vessels would be compressed via use of high-pressure compressors into high pressure tanks for disposition. In an alternative embodiment, the collection system 90 includes a negative pressure source above the permeable membrane to draw air flow up into the hood 91 from the water tank 80. In another alternative embodiment, the water tank 80 includes a port along its side for the collection of Oxygen as part of the gas collection system 90, where the port includes an off-shoot port extending up for Hydrogen collection. In a further embodiment to the embodiments in this paragraph, the separation system 92 includes means for causing a negative pressure differential on either side of at least one of the permeable membranes, for example, with a vacuum.

a. Desalination Example Embodiment

FIGS. 3-6 illustrate a variety of views including schematic, block, cross-section from a variety of angles of at least one embodiment for use in desalination of salt water (or in an alternative embodiment the processing of salt water to produce a variety of gases including but not limited to Hydrogen and Oxygen) that also includes optional additions to the underlying system that can be used in varying mixes of components. The system in at least one embodiment is in fluid communication with a water source 901, which in at least one embodiment includes at least some salt water, through a salt water intake 910, which in at least one embodiment includes a conduit such as one used to obtain water from a body of water 901 for use in a municipal water system. In further embodiments, the flow through the intake is regulated in a manner to provide for replenishment in the system of water while processed water passes on through the system. FIGS. 3-6 illustrate an optional receiving and pre-treatment tank (or buffer tank) 920 that in at least one embodiment includes one or more water treatment systems 85 (see, e.g., section b for examples) that in at least one embodiment increase the levels of Oxygen in the water without aid of air being added to the water during the process. In an alternative embodiment, the tank 920 (with or without a water processing system 85/85S) acts as a buffer tank to assist with the flow of water through the system and to maintain the salinity of the water in a desired range.

Figure 4:
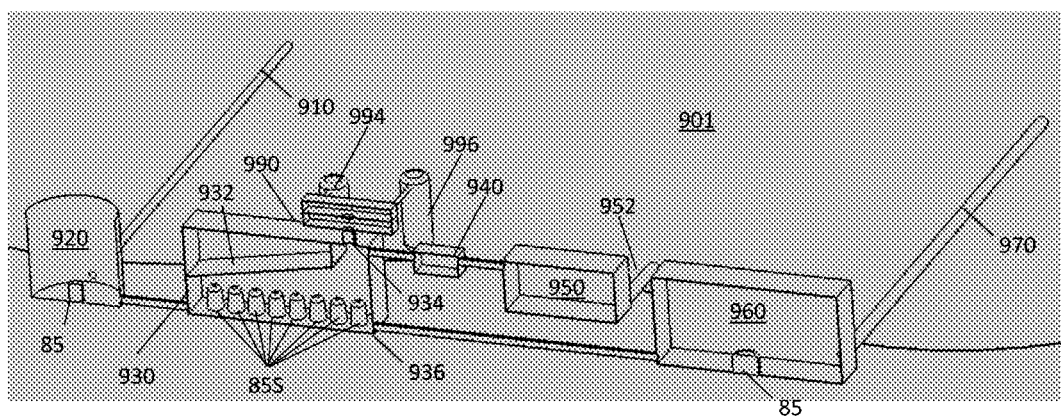
Figure 5:
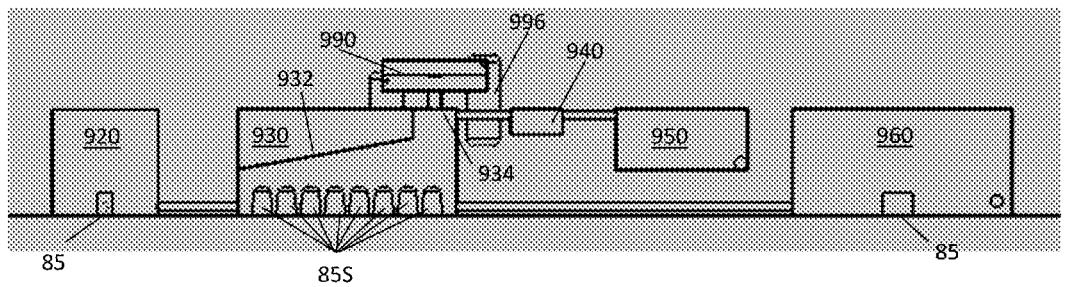

The water flows then into a water desalination tank (or processing tank or gasification unit) 930 that includes a plurality of water dissociation systems 85S directed to the production of gas from the water. An example of a water dissociation system 85S is illustrated in FIGS. 7A-8C along with FIGS. 9A-18E. Within the processing tank 930 a process of gasification occurs that in at least one embodiment releases Hydrogen and Oxygen gases to be differentiated and collected with, for example, by the collector (or gas capture system) 990 and/or the chiller/condenser 940. A small portion of the gases to be differentiated and collected are Hydrogen and Oxygen. The number of water dissociation systems 85S can vary along with fewer units being present if they are larger scale. As illustrated in FIGS. 4 and 5 in at least one embodiment, the processing tank 930 includes a slanted cavity ceiling 932 to assist with directing the expelled gases from the water towards the top of the cavity where the connection points are for the chiller/condenser unit 940 and/or the gas collector 990, which in at least one embodiment includes a membrane. The water dissociation systems 85S will cause gas to be released from the water as illustrated in FIGS. 20A-21C, which are photographs of a desalination test project using a modified version of a prototype illustrated in FIGS. 13A and 13B (without the housing).

In at least one embodiment, water will continuously flow through the water processing unit 930 at a rate that allows only for a specific level of rise in salinity to occur, which in at least one further embodiment is no more than 5% as the salt water progresses continuously through the system. One embodiment to accomplish this includes a salinity meter for determining the increase in salinity present in water in the cavity of the processing unit 930. The salinity meter is connected to a control unit. The control unit is connected to a pump to control the operation of the pump at least in part based on readings received from the salinity meter. In at least one embodiment, the pump is in-line with the pathway of salt water flow through the system.

As the water is circulated out of the processing tank 930, it flows towards an optional post process water collection and restructuring tank 960. In at least one embodiment, the restructuring tank 960 includes at least one water treatment system 85 directed at increasing the Oxygen level and/or restructuring the water to enliven the inner dynamics of the water (such as those discussed in section b) prior to it being discharged out of the system through discharge pipe 970, which may return the water to the water source 901 or some other destination. By using the restructuring tank 960, in at least one embodiment it is desired to return water that nourishes and improves the aqua-environment from which the water was taken. Alternatively, the restructuring tank 960 may be omitted from the system.

The chiller/condenser unit 940 when present receives at least a portion of the expelled gas into it for cooling of the gases leading to the coupling of Hydrogen and Oxygen molecules to reconstitute water, which in at least one embodiment will be substantially fresh water. The water that is recovered is collected and piped to a water distribution tank 950 that in at least one embodiment is omitted with the recovered water placed directly into a water distribution system. FIG. 2 illustrates an outlet pipe 952 from the distribution tank 950 that would be connected to the water distribution system.

An example of a chiller/condenser unit includes an ignition chamber, a duct to collect the produced steam from the ignition chamber and tubing or a chiller container to change the steam into water droplets. In an alternative example, the chiller/conditioner unit makes use of a catalyst as part of the conversion process.

In an alternative embodiment, fuel cell water production is used, which would produce energy and water as part of the reaction. Diatomic hydrogen enters one side of the cell, diatomic oxygen enters the other. Hydrogen molecules lose their electrons and become positive through oxidation. Oxygen molecules gain four electrons and are negatively charged through reduction. Negative oxygen ions combine with positive hydrogen ions to release electricity and form water. In a further embodiment, the energy can be used to provide power to the plant and/or system.

In at least one optional embodiment there is a gas capture system 990 that includes a membrane type gas differentiation and concentration system for separating gases from the outflow of processing tank 930 such as Oxygen and Hydrogen; however, based on this disclosure one of ordinary skill in the art should appreciate that other gases could be collected instead of being burned off and/or released into the environment. The membrane system if present would receive a portion of the expelled gases to separate the gases into Oxygen and Hydrogen where in at least one embodiment the separated gases are stored in respective Oxygen and Hydrogen holding tanks 994, 996. In at least one embodiment, the separated gases are used as a potential fuel source (such as combustion fuel or fuel cells) to provide power to the desalination system and/or collected for later use as commercial gas and/or released into the environment. In an alternative embodiment, the Oxygen and Hydrogen holding tanks 994, 966 provide the gas feed into the chiller/condenser unit 940 through pipes (or other conduit) and a control system to control the gas mixture supplied to the chiller/condenser unit 940.

In an alternative embodiment, the gas capture system 990 is present between the processing tank 930 and the chiller/condenser unit 940 to remove gases other than Oxygen and Hydrogen that may be present in the expelled gases, and in at least one further embodiment to provide separate flows of Oxygen and Hydrogen to the chiller/condenser unit 940.

In at least one alternative embodiment the gas capture system 990 includes one or more permeable membranes paired with at least one collection port. An example of this structure is that above the exit point 934 at the top of the cavity inside the processing tank 930 there is a collection port followed by a permeable membrane to separate Hydrogen from the other gases and upstream of the permeable membrane is a collection port for the Hydrogen. In other examples there are multiple separation levels. In a further embodiment, the air collected prior to the first permeable membrane (retentate stream) is recycled back into the space defined by the processing tank 930 to establish an air flow through the system to encourage movement of the released gas into the exit port 934. In a further embodiment, the recycling system includes a pump to establish a higher pressure in the air flow through the system. In an alternative embodiment, the gas capture system 990 includes a negative pressure source above the permeable membrane to draw air flow up into the ceiling of processing tank 930 from the water. In another alternative embodiment, the processing tank 930 includes a port along its side for the collection of Oxygen as part of the gas capture system 990, where the port includes an off-shoot port extending up for Hydrogen collection. In a further embodiment to the embodiments in this paragraph, the gas capture system 990 or another subsystem includes means for causing a negative pressure differential on either side of at least one of the permeable membranes, for example, with a vacuum. In a further embodiment, the gas capture system 990 includes the previously described separation system 92.

FIGS. 7A-8C illustrate a water dissociation system that could be used in the processing tank 930 of the desalination plant. The various embodiments illustrated in FIGS. 7A-7H can have the discharge outlets 232A increased in height relative to the rest of the system to place the top nearer the anticipated water surface in the tank. One configuration example includes placing the vortex module above the disk-pack module with the drive system module below the disk-pack module as illustrated in FIGS. 7A-7E. In at least one embodiment to limit the exposure of the salt water on the motor of the drive system module, the motor is located external to the processing tank floor as illustrated in FIG. 7F and a drive shaft passes through the floor 970 of the tank to engage the disk-pack module, and this arrangement can be utilized in the other water treatment systems with drive system modules below the disk-pack modules discussed in this disclosure. In another configuration example includes placing the vortex module below the disk-pack module where the drive system module is on top of the system as illustrated in FIGS. 7G and 7H. In this example, the vortex chamber intakes would be spaced off the cavity floor 936 of the processing tank 930, and in a further embodiment the system itself would be elevated on a set of risers, which in an alternative embodiment would be added to provide additional stability to each system. In one further example to this configuration, the motor of the drive system module would reside above the anticipated surface of the water in the processing tank to at least in part limit its exposure to the salt water where a long drive shaft 314A' would support the motor as illustrated in FIG. 7I. In an alternative, there would be a horizontal support beam and/or platform in the processing tank cavity to provide further lateral support. In another alternative, the motor would reside above the cavity ceiling and have the driveshaft pass through the cavity ceiling 932 that would also provide a structure to lift the vortex chamber off the cavity floor 936. Under either example where the motor is outside the cavity, the driveshaft would be sealed against the cavity structure with, for example, a seal or gasket. Under either of the base examples, the drive system module may be present below the water level.

FIGS. 7A-7I illustrate an water dissociation system embodiment for use in the gasification stage of the desalination process, but could also in further embodiments be used as part of any other processing described in this disclosure with, for example, an increase in the size of the chamber/channel around the disk-pack turbine and a change in the discharges similar to that of the embodiments discussed in section b.

The illustrated embodiments include common vortex modules 100A, disk-pack modules 200A, and drive system modules 300A. FIGS. 7G-7I reverse the order of the modules. Based on the discussion in section b of this disclosure, it should be appreciated that a variety of support members could be added to the illustrated systems around, for example, the vortex housing 120A and the elongated driveshaft 314A'.

The vortex module 100A includes a housing (or cover) 420A around the vortex chamber housing 120A having a vortex chamber 130A. The housing 420A includes a valve controlled inlet 432A, which although illustrated as being a manual valve could be replaced by an electronically controlled valve. In an alternative embodiment, the valve 422A is omitted. In at least one embodiment, the inlet valve can restrict the inflow water into the housing 420A to establish a negative/vacuum condition and effectively stretching the fluid volume as it enters the vortex inlets 132A. The illustrated vortex chamber 130A includes three vortex inlets 132A for supplying water into the vortex chamber 130A. In at least one embodiment, the vortex inlets include a convergent entrance into the inlet 132A' as illustrated in FIG. 7E. The vortex chamber 130A could take a variety of forms as discussed in connection with the other water processing systems in this disclosure.

The vortex chamber 130A feeds water into the disk-pack turbine 250A residing in a chamber 230A of the disk-pack housing 220A. The disk-pack turbine 250A includes a first (or top) disk 260A, a second (or bottom) disk 264A, and at least one middle disk 266A that define an expansion chamber 252A that receives the water from the vortex chamber 130A. The waveforms present on the disks 260A, 264A, and 266A are discussed in more detail in connection to FIGS. 8A-8C with the middle disk 266A having waveforms on the top and bottom sides of the disk. As illustrated in FIGS. 7C and 7D, the chamber 230A includes a discharge channel 231A that passes around the outside of the disk-pack turbine 250A starting at about the point the prior discharge channel 231A extends away from the chamber 230A to the discharge outlet 232A. The discharge outlet includes a housing 2322A that includes a cavity 2324A that flares out over its height from where the discharge channel 231A connects to the cavity 2324A. In an alternative embodiment, the discharge outlet discussed in connection with FIGS. 13A and 13B is used in its entirety or alternatively the discussed protrusions are used.

The illustrated discharge outlets 231A are proximate to the chamber 230A to continue the spinning flow of the water as it leaves the system, which in at least one embodiment will increase the gasification level of the water being processed, because it shortens the time in which the water can be reassimilate the gas. Although there are two discharge outlets 232A illustrated, it should be understood from this disclosure that one discharge could be used instead or a plurality of discharge ports around the periphery of the discharge chamber may be provided. In at least one embodiment, the top of the discharge ports will be proximate to (or below) the anticipated height of the water level in the processing tank to further minimize the opportunity for the gas that has been released being reassimilated into the water.

FIGS. 8A-8C illustrate a disk-pack turbine 250B having at least two disks 260B, 264B each with matching waveforms on their respective facing surfaces. In at least one embodiment, there is one or more disks inserted between the two illustrated disks 260B, 264B where in at least one embodiment each of the middle disks 266A will include waveforms on both faces as illustrated, for example, in FIG. 7C. This disk pack turbine 250B is different than the others illustrated and discussed in this disclosure. The disks are thicker and include more complex waveforms and a different form of a wing shim. The expansion chamber 252B is different in that it is defined by the opening passing through the axial center of the bottom disk 264B and includes the gap (or disk chamber) 262B between the disks given the illustrated central flat region 2602B illustrated in FIG. 8B.

In this disclosure, waveforms include, but are not limited to, circular, sinusoidal, biaxial, biaxial sinucircular, a series of interconnected scallop shapes, a series of interconnected arcuate forms, hyperbolic, and/or multi-axial including combinations of these that when rotated provide progressive, disk channels with the waveforms being substantially centered about an axial center of the disk and/or an expansion chamber. The waveforms are formed, for example but not limited to, by a plurality of ridges (or protrusions or rising waveforms), grooves, and depressions (or descending waveforms) in the waveform surface including the features having different heights and/or depths compared to other features and/or along the individual features. In some embodiments, the height in the vertical axis and/or the depth measured along a radius of the disk chambers vary along a radius as illustrated. In some embodiments, the waveforms are implemented as ridges that have different waveforms for each side (or face) of the ridge. In this disclosure, waveform patterns (or geometries) are a set of waveforms on one disk surface. Neighboring rotor and/or disk surfaces have matching waveform patterns that form a channel running from the expansion chamber to the periphery of the disks. In this disclosure, matching waveforms include complimentary waveforms, mirroring geometries that include cavities and other beneficial geometric features.

FIG. 8B illustrates a bottom view of the top disk 260B and FIG. 8C illustrates a top view of the bottom disk 264B. The top disk 260B includes a plurality of recesses 2604B present around its axial center for receiving the vertical members 2644B of the bottom disk 264B. Each of the vertical members 2644B includes a passageway (not illustrated) passing through its height for receiving a support shaft that assists in adjusting the gap (or disk chamber height) 262B that will be present between the top and bottom disks 260B, 264B. In at least one embodiment, the cavities 2604B and vertical members 2644B are switched between the disks. The illustrated vertical members 2644B form convergent channels 2622B between neighboring members that than expand out to provide divergent channels 2624B. This structure in at least one embodiment increases the speed at which the water will travel from the expansion chamber 252B into the disk chamber 262B formed between the top and bottom disks 260B, 264B.

After the water passes through the convergent/divergent channels 2622B, 2624B it encounters a set of waveforms 2606B such as the illustrated hyperbolic waveforms that will impart additional motion to the water including in at least one embodiment establishing a counter flow that will in turn largely be caught up in the flow of water from the expansion chamber.

The outer band of illustrated waveforms includes a plurality of vanes 2607B having channels 2608B between the ridges 2609B that curve out away from beyond the set of waveforms to the periphery of the disk and in at least one embodiment the channels' 2608B width increases along its length. In at least one embodiment, the channel 2608B has a shape similar to an "S" curve. During operation, the water will flow through the channels 2608B and partially pass over the ridges 2609B further stretching and spinning the water molecules to encourage the release of Oxygen and Hydrogen.

In at least one embodiment, the periphery of the disk-pack turbine 250B is not circular, but instead includes a waveform or scallop shapes around the perimeter as illustrated in FIGS. 8B and 8C.

b. Additional Water Processing System Examples

FIGS. 9A-18E illustrate a variety of water processing system examples for us in at least one embodiment according to the invention, and in further embodiments the following water processing system examples are useful as water treatment systems in the oxygenation and/or revitalization applications discussed above. Although the illustrated units are not as efficient in producing gas as the previously described water dissociation system, in at least one embodiment the example water treatment systems are used as water dissociation systems. The different illustrated examples share common features for the invention that facilitate the movement of fluid through the device and resulting in many of the examples revitalizing fluid in a vessel by having the outputted water from the device propagate throughout the vessel containing the water or the water source where the water is returned. In many of the examples, the water enters into a vortex chamber that includes a plurality of inlets that are spaced apart. The vortex chamber further increases the rotational speed of the water as the water passes through the vortex chamber into an expansion and distribution chamber (or expansion chamber). The water in at least one example is drawn into the expansion chamber at least in part by a disk-pack turbine. The water is drawn into and through the space (or disk chambers) between the disks of the disk-pack turbine into an accumulation, energy exchange and discharge chamber (or discharge chamber) surrounding the disk-pack turbine. The discharge chamber discharges the water through at least one discharge port (or outlet). In at least one embodiment, the discharge chamber includes a discharge channel around the disk-pack turbine that directs the flow towards at least one discharge outlet.

1. First Example Water Treatment System

FIGS. 9A-9C illustrate an example water treatment system that could be used as part of the overall system. The illustrated example includes a vortex module 100C, a disk-pack module 200C, a motor module 300C, and a pump (or intake) module 400C. The pump module 400C, via axial centrifugal suction, draws water (or fluid) into the pump module which, under positive pressure, delivers water into the vortex module 100 that shapes the in-flowing water into a through-flowing vortex which continually feeds the concentrated rotating fluid into the disk-pack module 200 prior to discharging.

The motor module 300C illustrated, for example, in FIG. 9C includes a dual shaft motor 310C that drives both a disk-pack 250C with the driveshaft 314C and an impeller 410C with the driveshaft 312C. The motor 310C in at least one example is electrical and powered by a power source (not illustrated). In an alternative example the illustrated housing 320C for the motor module 300C is eliminated; and the motor 310C is located in another module either in its own housing or in a cavity within the housing of another module.

The pump module 400C includes an optional bottom suction 8-bladed impeller 410C within a triple-outlet housing 420C as illustrated, for example, in FIG. 9C. The number of blades 412C may number other than eight, for example, any number from two to twelve. The illustrated pump chamber 430C is fed through an axial inlet 432C that draws water from approximately a central point below the system through an axial passageway that opens into the bottom of the pump chamber 430C. The illustrated pump module 400C includes a plurality of pump outlets 422C is connected via pipe/tubing (or conduit) to a corresponding inlet 132C for the vortex induction chamber 130C in the vortex module 100C.

The vortex induction chamber 130C is a cavity formed inside a housing 120C of the vortex module 100C. The illustrated vortex induction chamber 130C includes a structure that funnels the water into a vortex upper section 134C having a bowl (or modified concave hyperbolic) shape for receiving the water that opens into a lower section 136C having conical-like (or funnel) shape with a steep vertical angle of change that opens into the disk-pack module 200C. In at least one example, the vortex chamber 130C is formed by a wall 137C. The sides of the wall 137C follow a long radial path in the vertical descending direction from a top to an opening 138C that reduces the horizontal area defined by the sides of the wall 137C as illustrated, for example, in FIG. 9C.

As the water passes through the base discharge opening 138C it enters into the revolving expansion chamber 252C in the disk-pack module 200C. Most of the volumetric area for the expansion chamber 252C is formed by the center holes in the separated stacked disks 260C which serve as water inlet and distribution ports for stacked disk chambers 262C. An example of a disk-pack turbine 250C is illustrated in FIG. 9C. The illustrated disk-pack turbine 250C includes the top rotor 264C, a plurality of stacked disks 260C, and the bottom rotor 268C having a concave radial depression 2522C in its top surface that provides a bottom for the expansion and distribution chamber 252C. The illustrated bottom rotor 268C includes an integrally formed motor hub 269C to couple to the upper drive shaft 314C.

Additional impelling influences in at least one embodiment are derived from the rotating wing-shims 270C, which also space and support the disks 260C from each other to provide space 262C through which water travels from the expansion chamber 252C to the discharge chamber 230C. The structure, the number, and the location of the wing shims 270C can vary along with their structure and dynamic function.

The disk-pack turbine 250C is held in alignment by the housing 220C, which includes a discharge chamber 230C in which the disk-pack 250C rotates and discharges water into. The discharge chamber 230C is illustrated as having a hyperbolic paraboloid cross-section that leads to a plurality of discharge ports 232C on the outside periphery of the housing 220C. In this illustrated example, there are two discharge ports 232C, but more discharge ports 232 may be added and, in at least one example, the discharge ports 232C are equally spaced around the housing periphery as illustrated in FIGS. 9A and 9B, which also illustrates the outside of the disk-pack module housing 220C. The discharge chamber 230C gathers the fluid after it has passed through the disk-pack turbine 250C to accumulate, exchange energies, and further generate, for example, mixed flows, pressures, counter-flows, currents, vortices, and temperature.

While progressing through the vortex induction chamber 130C, the expansion chamber 252C, over disk-pack surfaces, through the discharge chamber 230C and out through its discharge ports 232C, the fluid is exposed to a multiplicity of dynamic action and reactionary forces and influences, all of which work in concert to achieve desired outcomes relative to water-enhancing processes.

2. Second Example Water Treatment System

FIGS. 10A and 10B illustrate another example water treatment system that shares similarities with the previous example despite differences in the external design for the vortex module 100D and combination motor and intake module 400D.

The combination motor and intake module 400D includes a housing 420D that includes a cylindrical screen 426D with a cylindrical base 428D with an enclosed bottom. The housing 420D surrounds a motor 310D that is mounted under the disk-pack module 200D for driving the disk-pack 250D with its single shaft 314D (as a double shaft is not needed for this example with the omission of an impeller). In an alternative example, the motor is located in a protective housing isolating it from the disk-pack module and further protects the motor from the fluid beyond the protection offered by the motor housing. The screen 426D provides a barrier for extraneous material that may be present in the water. Once the water passes through the screen 426D, it will then be drawn into the plurality of conduits (not shown) connecting the intake module 400D with the vortex module 100D.

The combination motor and intake module 400D and the vortex module 100D are connected together with conduit (not shown). Each module includes an equal number of connectors (outlets 422D/inlets 132D, respectively).

The structure of the vortex module 100D remains the same in terms of its operation; however, the illustrated external housing 120D is smaller and more fitted about the vortex chamber 130D with the addition of structural support members 126D extending up from a bottom plate 128D that connects to the disk-pack module 200D to a point part way up the vortex module 100D to a support ring 125D. In a further example, the support structure is omitted or configured in a different way.

The disk-pack module 200D has some similarities to the previously described disk-pack module 200D as illustrated in FIG. 10B. The disk-pack turbine 250D includes a top plate 264D, a plurality of disks 260D, and a bottom plate 268D that includes a motor coupling (or hub). The illustrated discharge chamber 230D has a slightly different toroid/paraboloid shape, as illustrated in FIG. 10B, than the previous example and is connected to discharge ports 232D. The disk-pack turbine 250D includes an oval expansion chamber in which to receive the incoming water flow from the vortex chamber 130D. The disk-pack turbine 250D in this example, as illustrated, is a larger disk-pack than the previous example in terms of the number of stacked disks 260D.

In other alternative embodiments, the screen is located over the vortex inlets and/or vortex housing.

3. Third Example Water Treatment System

FIGS. 11A-11C illustrate a further example water treatment system, which is similar to prior examples and includes a vortex module 100F, a disk-pack module 200F, and a combined motor/intake module 400F.

As illustrated, for example, in FIG. 11A, motor/intake module 400F includes a pair of screens 426F, 427F that together with a base 420F provide the housing for the module 400F. The relative position of the two screens 426F, 427F to each other define whether there are any openings through which the water may pass along with the size of the resulting openings. In at least one example, the screens 426F, 427F together are a filter. The outlets 422F are connected to the inlets 132F.

FIG. 11A illustrates a vortex module 100F similar to the previous example. The example illustrated in FIG. 11A includes structure support members 126F similar to that of the second example that each include a support column 127F extending down from the top of the main body 124F to abut against a support column 123F extending up from a support plate 128F.

FIG. 11B illustrates a disk-pack module 200F that receives the water from the vortex chamber. The disk-pack module 200F includes two housing pieces 2202F, 2204F that are identical to each other thus expediting assembly of the device. Each housing piece also includes an axially centered opening having a diameter to allow for the vortex chamber to pass through or the motor shaft depending upon orientation of the housing piece in the assembled device. FIG. 11C illustrate an example of a disk-pack turbine 250F. The top rotor 264F includes a cylindrical intake and openings for connecting to wing shims 270F spaced from the axial center of the rotor. The bottom rotor 268F has a similar structure to the top rotor 264F, but instead of an opening passing through its axial center there is a motor mount and a concave feature 2522F axially centered on the plate to form the bottom of the expansion chamber 252F. The illustrated disk-pack turbine 250F is an example that includes 16 disks 260F. The wing shim 270F includes spacers sized to fit around a standoff member 273F attached to the top rotor 264F and the bottom rotor 268F with bolts 276F.

4. Fourth Example Water Treatment System

FIGS. 12A and 12B illustrate a further example water treatment system. This illustrated example combines the intake module and the vortex module 100G together such that the vortex module 100G draws the water (or other fluid) directly into the vortex chamber 130G through a plurality of openings 132G. This example also places the motor module 300G with motor 310G at the bottom of the device to drive the disk-pack 250G, which is driven by driveshaft 314G.

One way for the vortex chamber 130G to attach to the housing 120G is through a screw connection such that the inside of the housing 120G includes a plurality of grooves to receive the protrusions 131G around the top of the vortex chamber 130G. Although the openings 132G are illustrated as having a spiral configuration, other opening arrangements are possible while still providing for the flow of water (or other fluid) into the device. As illustrated in FIG. 12B, the vortex chamber 130G includes a collection area that is substantially of the same diameter as the area covered by the intake openings 132G. As water flows through the vortex chamber 130G, the rotation is assisted by the closing in of the chamber walls to form a floor area before beginning a steep descent to the bottom end 138G and into the inlet for the disk-pack turbine 250G.

The illustrated disk-pack module includes a housing formed with a top part 2202G and a bottom part 2204G that provides the space for the discharge chamber 230G around the disk-pack turbine 250G in addition to providing the channels that form the discharge ports.

FIG. 12B provides a view of an example of a cross-section that may be used for the discharge chamber 230G that provides a substantially flat surface before expanding the height of the discharge chamber 230G by having the floor and ceiling of the chamber curve away from each other such that the maximum height of the chamber is at a distance from the center substantially equal to the radius of the disk-pack turbine 250G. Beyond the point of maximum height in the discharge chamber 230G, the floor and the ceiling curve towards each other to form the side wall through which the discharge outlets exit from the discharge chamber 230G in a swirl motion.

5. Fifth Example Water Treatment System

The illustrated system of FIGS. 13A and 13B includes a housing module 500H, an intake module 400H, a vortex module 100H, a disk-pack module 200H, and a motor module 300H. FIG. 13A illustrates an example of a housing module 500H including a cover 520H that covers the intake module 400H and the vortex module 100H. The housing module 500H as illustrated includes a plurality of support members 524H and 526H that align and support the vortex module 100H, the intake module 400H, and the cover 520H.

The water flows in at the inlet 522H and up to an intake catch 425H as illustrated, for example, in FIG. 13A. The water after entering the intake catch 425H enters into the intake chamber 430H through the intake screen 426H, which forms a substantial portion of the bottom of the intake catch 425 as illustrated, for example, in FIG. 13B. The screen blocks material and other debris above a certain size based on the size of the openings in the screen 426H.

As illustrated in FIG. 13A, the intake chamber 430H includes a substantially paraboloid shape upper section that narrows into a solids outlet 438H to collect particulate, precipitated solids, and/or concentrated solids from the intake chamber 430H. In at least one embodiment, the chamber shape encourages rotational movement in the water to form a whirlpool in the intake chamber 430H with a funnel shape from the negative pressure in the disk pack turbine 250H pulling through the vortex chamber 130H and the conduits 490H, and the resulting whirlpool precipitates solids present in the water into the solids outlet 438H. The solids outlet 438H in at least one embodiment connects to a hose (or conduit) 590H that is routed out through an opening in the cover 520H.

Near the top of the intake chamber 430H, there are a plurality of outlets 432H connected to the conduits 490H that are in fluid communication with the vortex chamber 130H in a cavity formed inside a housing 120H of the vortex module 100H to shape the in-flowing water into a through-flowing vortex that is fed into the disk-pack module 200H.

Figure 6:
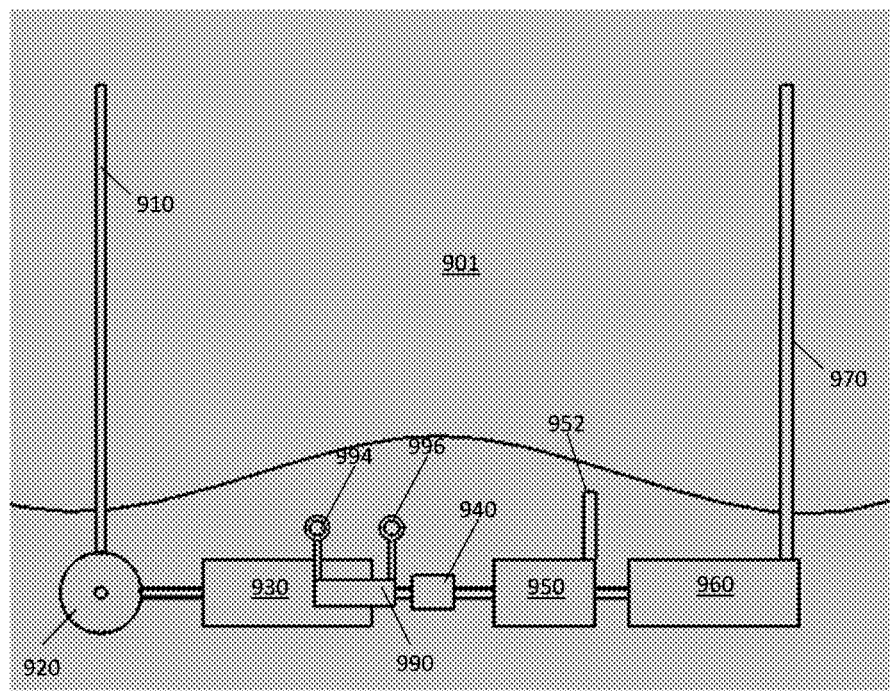

In at least one embodiment illustrated, the water passes through the base discharge opening 138H into the expansion chamber 252H in the disk-pack turbine 250H of the disk-pack module 200H as illustrated, for example, in FIGS. 5 and 6. An example of a disk-pack turbine 250H is illustrated in FIG. 13A.

Once the water passes through the disk-pack turbine 250H, it enters the accumulation chamber 230H in which the disk-pack turbine 250H rotates. The accumulation chamber 230H is an ample, over-sized chamber within the disk-pack module 200H. The accumulation chamber 230H gathers the fluid after it has passed through the disk-pack turbine 250H. The shape of the accumulation chamber 230H is designed to provide its shortest height proximate to the perimeter of the disk-pack turbine 250H. Beyond the shortest height there is a discharge channel 231H that directs the water around to the discharge outlet 232H and also in at least one embodiment provides for the space to augment the water in the accumulation chamber 230H through an optional supplemental inlet 290H. The discharge channel 231H has a substantially elliptical cross-section (although other cross-sections are possible). The accumulation chamber wall in at least one embodiment closes up to the perimeter of the disk pack turbine 250H at a point proximate to the discharge channel 231H exits the accumulation chamber 230H to provide a passageway that travels towards a discharge chamber 2324H.

The discharge outlet 232H includes a housing 2322H having a discharge chamber 2324H that further augments the spin and rotation of the water being discharged as the water moves upwards in an approximately egg-shaped compartment. In an alternative embodiment, the output of the discharge outlet 232H is routed to another location other than from where the water was drawn into the system from. In at least one embodiment, the housing 2322H includes an upper housing 2322H', which can be a separate piece or integrally formed with housing 2322H that defines an expanding diameter cavity for discharging the water from the system. The discharge chamber 2324H includes a particulate discharge port 2326H that connects to a conduit 592 to remove from the system, for example, particulate, precipitated matter and/or concentrated solids that have precipitated out of the water during processing and to route it away from the system in at least one embodiment. In at least one embodiment, the shape of the discharge chamber 2324H facilitates the creation of a vortex exit flow for material out through the particulate discharge port 2326H and a vortex exit flow for the water out through the discharge outlet 232H forming multiple vortical solitons that float up and away from the discharge outlet 232H spinning and in many cases maintaining a relative minimum distance amongst themselves. The vortical solitons in this embodiment continue in motion in the container in which they are discharged until they are interrupted by another object.

In at least one embodiment, the discharge chamber 2324H includes at least one spiraling protrusion 2325H that extends from just above (or proximate) the intake (or discharge port or junction between the passageway coming from the accumulation chamber 230H and the discharge chamber 2324H) into the discharge chamber 2324H up through or at least to the discharge outlet 232H (and/or upper housing 2322H') to encourage additional rotation in the water prior to discharge. In at least one embodiment, the spiraling protrusion 2325H extends up through the discharge outlet 232H. The spiraling protrusion 2325H in at least one embodiment spirals upward in a counterclockwise direction when viewed from above.

In at least one embodiment, the discharge chamber 2324H includes at least one (second or particulate) spiraling protrusion 2327H that extends from just below and/or proximate to the intake 2321H (illustrated in FIG. 13B) down through the discharge chamber 2324H towards the particulate discharge port 2326H. When viewed from above, the spiraling protrusion 2327H spirals in a counter-clockwise direction. Based on this disclosure, it should be understood that one or both of the spiraling protrusions 2325H, 2327H could be used in at least one embodiment. In an alternative embodiment to the above protrusion embodiments, the protrusions are replaced by grooves formed in the discharge chamber wall.

As illustrated in FIG. 13A, the discharge chamber's diameter shrinks as it approaches the upper housing 2322H', which as illustrated includes a long radii expanding back out to decompress the discharged water for return to the tank. In an alternative embodiment, the long radii begins proximate to the intake 2321H in the discharge chamber 2324H. This structure in at least one embodiment provides for a convergence of flow of water prior to a divergence back out of the flow of water.

The base of the illustrated system is the motor module 300H that includes a housing 320H with an outwardly extending base 324H having a plurality of feet 322H spaced around the periphery of the base 324H to provide support and distribute the weight of the system out further to provide stability in at least one embodiment. The motor housing 320H substantially encloses the motor 310H, but there may be multiple openings 326H through which water can pass and cool the motor in at least one embodiment. The motor housing 320H provides the base on which the disk-pack module 200H rests and is connected to by bolts or the like connection members.

6. Sixth Example Water Treatment System

FIG. 14 illustrates another water treatment system example that is similar to the previous example and sharing the disk-pack module 200H and the motor module 300H. The intake module 400J and the vortex module 300J are different. Although a housing is not illustrated, it should be understood based on this disclosure that the housing could take a variety of forms while providing a cover over the other modules. In addition, a screen may be included that covers the intake module and the vortex module. The illustrated intake module includes a plurality of intakes 490J that lead to the vortex chamber 130J. The intakes 490J extend down from the vortex inlets 132J of the vortex chamber 130J as illustrated, for example, in FIG. 14. The remainder of the vortex module is similar to the previous example. FIG. 14 does illustrate an example of a taller discharge outlet 232J.

FIG. 14 also illustrates the presence of the supplemental inlet 290H with an optional valve 294H into the accumulation chamber of the disk-pack module 300H to augment the water present in the accumulation chamber.

7. Seventh Example Water Treatment System

The various water treatment systems discussed above could be used without the vortex chamber or other input modules allowing the disk-pack turbine to draw the fluid directly from the water source into the expansion chamber. In a further example, the housing around the disk-pack turbine is removed and the disk pack discharges the water directly from the periphery of the disk-pack directly into the container that it is running in. These examples may be combined together in a further example. One impact of running the system in an open configuration is that the vortex created leads to the creation of extremely powerful whirlpools that are believed will be beneficial for mixing of the water present in the vessel containing the water being treated. Experimental systems have been capable of establishing a very concentrated "eye of the whirlpool" which will draw in surface air at disk-pack submerged depths of more than two feet.

c. Controller

FIG. 15 illustrates an example for the addition of a controller 500 to the above-described water processing systems. The above-described motor modules 300/400 may be provided with a variety of operation, control, and process monitoring features. Examples include a switch (binary and variable), computer controlled, or built-in controller resident in the motor module 300. Examples of a built-in controller include an application specific integrated circuit, an analog circuit, a processor or a combination of these. The controller in at least one example provides control of the motor via a signal or direct control of the power provided to the motor. The controller in at least one example is programmed to control the RPM of the motor over a predetermined time based on time of day/week/month/year or length of time since process start, and in other examples the controller responds to the one or more characteristics to determine the speed at which the motor is operated.

In at least one example, the controller monitors at least one of the voltage, amperage, and RPM of the motor to determine the appropriate level of power to provide to the motor for operation. Other examples of input parameters include chemical oxygen demand (COD), biological oxygen demand (BOD), pH, ORP, dissolved oxygen (DO), bound oxygen and other concentrations of elements and/or lack thereof and have the controller respond accordingly by automatically adjusting operational speeds and run times. In examples that utilize electrolytic and magnetic effects, the controller will also control the operation of the system with respect to these effects. FIG. 16 illustrates an example similar to FIG. 15 with the addition of a sensor 502 in the hood 91 that detects the flow of gas into the gas separation system 92 and/or the composition of the gas being collected. Similar uses of sensors and controllers can be used to monitor the salinity level in the salt water being processed to determine when to discharge water and draw more water into the processing tank.

d. Additional Disk-Pack Turbines

A further example of the disk-pack turbine includes a plurality of disks having waveforms present on them as illustrated in FIGS. 17A-18E. Although the illustrated waveforms are either concentric circles (FIGS. 17A and 17B) or biaxial (FIGS. 18A-18E), it should be understood that the waveforms could also be sinusoidal, biaxial sinucircular, a series of interconnected scallop shapes, a series of interconnected arcuate forms, hyperbolic, and/or multi-axial including combinations of these that when rotated provide progressive, disk channels with the waveforms being substantially centered about an expansion chamber. The shape of the individual disks defines the waveform, and one approach to creating these waveforms is to stamp the metal used to manufacture the disks to provide the desired shapes. Other examples of manufacture include machining and/or casting of the individual disks. The illustrated waveform disks include a flange 2608 around their perimeter to provide a point of connection for wing shims 270 used to construct the particular disk-pack turbine.

FIGS. 17A-18E illustrates respective disk-pack turbines 250X, 250Y that include an upper rotor 264X and a lower rotor 268X that have a substantially flat engagement surface (other than the expansion chamber elements) facing the area where the disks 260X, 260Y are present. In an alternative embodiment, the disk-pack turbine includes an upper rotor and a lower rotor with open areas between their periphery and the expansion chamber features to allow the waveforms to flow into the rotor cavity and thus allow for more disks to be stacked resulting in a higher density of waveform disks for disk-pack turbine height.

FIG. 17A illustrates a side view of an example of the circular waveform disk-pack turbine 250X. FIG. 17B illustrates a cross-section taken along a diameter of the disk-pack turbine 250X and shows a view of the disks 260X. Each circle waveform is centered about the expansion chamber 252X. The illustrated circle waveforms include two ridges 2603X and three valleys 2604X. Based on this disclosure, it should be appreciated that the number of ridges and valleys could be reversed along with be any number greater than one limited by their radial depth and the distance between the expansion chamber 250X and the flange 2608.

Figure 18A:
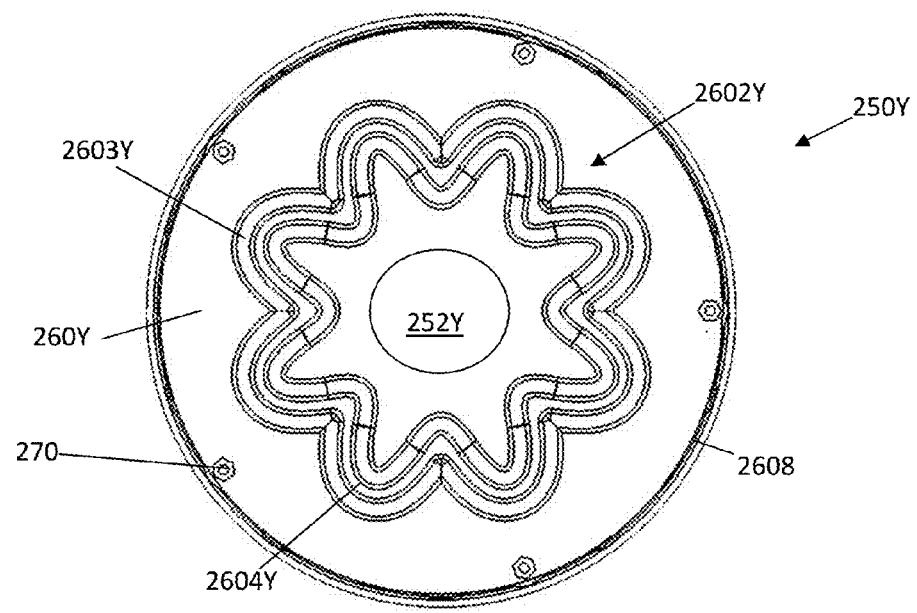
Figure 18B:
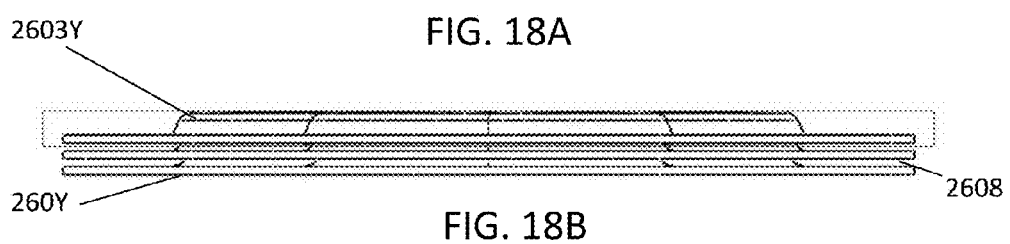
Figure 18C:
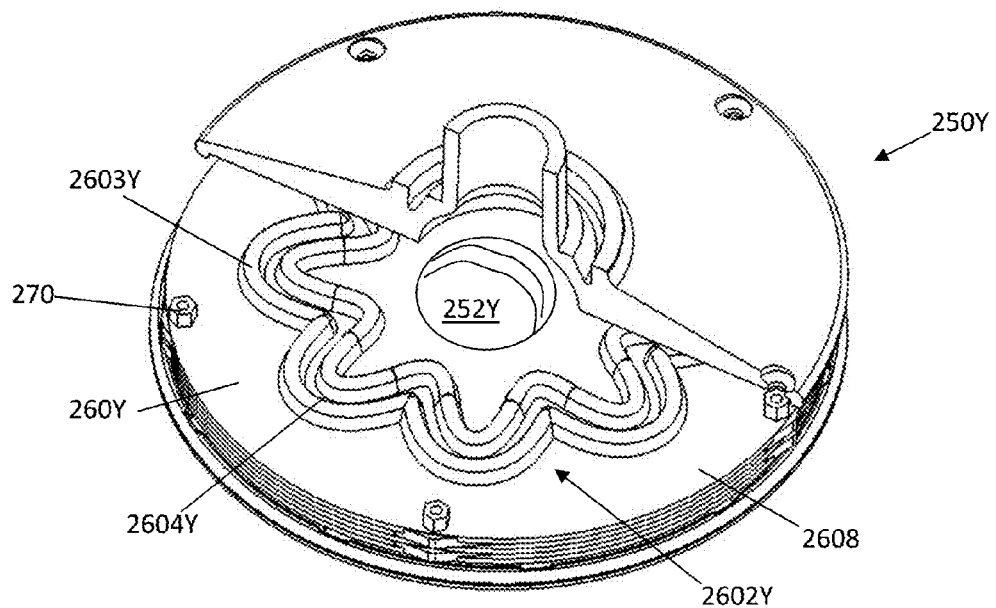
Figure 18D:
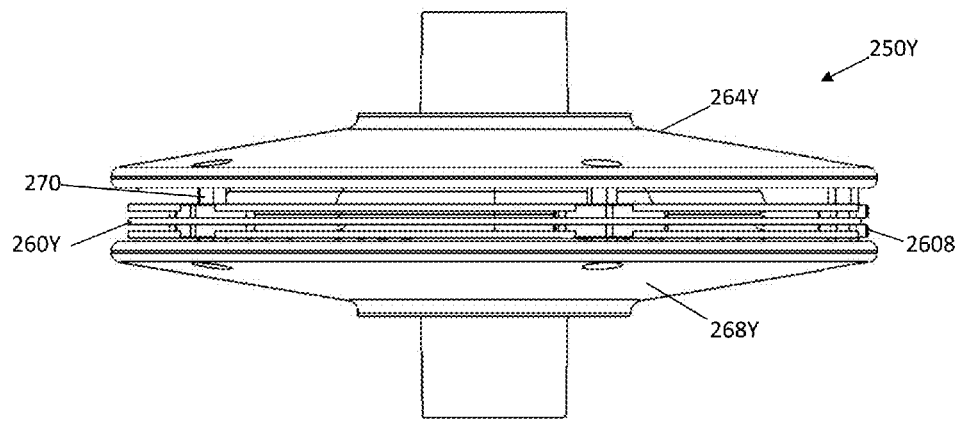
Figure 18E:
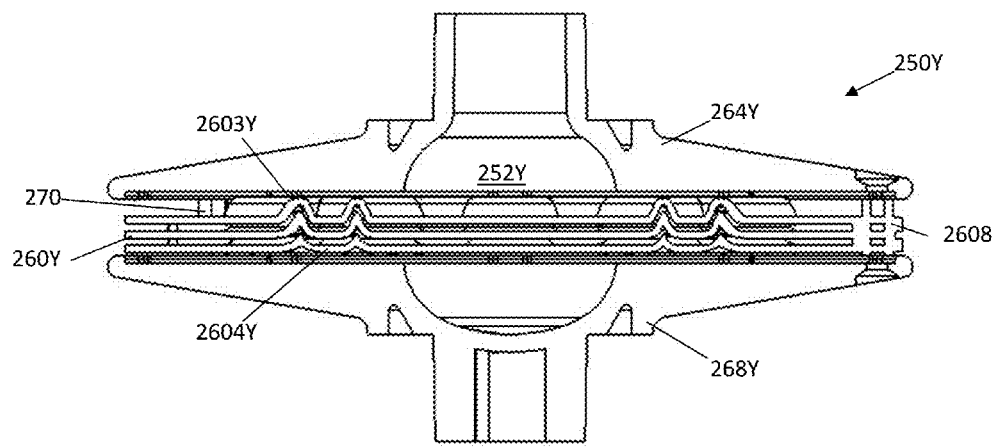

FIG. 18A illustrates a top view of a disk-pack turbine 250Y without the top rotor 264X to illustrate the biaxial waveform 2602Y, while FIGS. 18B-18E provide additional views of the disk-pack turbine 250Y. The illustrated biaxial waveform 2602Y that is illustrated as including two ridges 2603Y and one valley 2604Y centered about the expansion chamber 252Y. Based on this disclosure, it should be appreciated that the number of ridges and valleys could be reversed along with be any number greater than one limited by their radial depth and the distance between the expansion chamber 252Y and the flange 2608. FIG. 18B illustrates a side view of three waveform disks 260Y stacked together without the presence of wing shims 270 or the rotors 264X, 268X. FIG. 18C illustrates a partial cross-section of the disk-pack turbine 250Y. FIG. 18D illustrates a side view of the assembled disk-pack turbine 250Y. FIG. 18E illustrates a cross-section taken along a diameter of the disk-pack turbine 250X and shows a view of the disks 260Y.

e. Other Variants

Based on this disclosure, it should be appreciated that there is a tremendous amount of flexibility in the disk-pack turbines. For example, the number of disks in the disk-packs in most examples will range between 2 to 14 disks, but the number of disks may be greater than 14. The size in terms of thickness and diameter (both of the opening and the disk itself) can vary depending on the application and the desired throughput.

The expansion chamber may take a variety of shapes based on the size and shape of the opening through the disks that make up a particular disk-pack turbine. In at least one example, the center holes through the disk are not consistent size in the disks that make-up a disk-pack turbine. For example, the center holes are different diameters and/or different shapes. In a further example, the disks include a waveform or geometric pattern along at least one side of the disk.

In at least one example, one or more disks include an impeller with a plurality of blades in the center opening passing through the disk, the blades are orientated to provide additional suction forces to draw fluid through the passageway between the vortex chamber and the expansion chamber. In at least one implementation, the impeller is integrally formed with the disk, while in another implementation the impeller is an insert piece that engages the central opening in the disk, for example, with friction, press fit, and/or snap-in.

The materials used to manufacture the disks can range from a variety of metals to plastics including using different materials for the disks within one disk-pack turbine with examples as follows. A disk-pack turbine assembled with polycarbonate housings, brass wing-shims and stainless steel disks renders product water with, among other attributes, oxidation/rust inhibiting characteristics. A disk-pack turbine made of all-plastic materials with a disk gap tolerance of 1.7 mm rapidly precipitates suspended solids, chills and densifies water and also produces high levels of dissolved oxygen. The concept of densifying water includes reducing the volume occupied by water after it has been processed by the system. Disk-pack turbines constructed with disk gap tolerances above 2.5 mm tend to precipitate virtually all solids out of suspension, including dissolved solids over time, resulting in very low dissolved solids instrument readings, i.e., 32 ppm.

In embodiments intended for the Southern hemisphere, the rotation and orientation of components could be in a clockwise configuration.

The invention lends itself to a great degree of variability relative to scale and functional characteristics and will be produced for general use to highly specialized versions that build upon the previously described examples.

As has been mentioned, the number of discharge ports and their orientation can be adjusted to further refine or impact the generation of motion in the surrounding water based on the discharge of water from the device. The geometry of the cross-section of the discharge port may take a variety of forms from the illustrated circular cross-section with a long radii path from the discharge chamber to the outlet compared to the toroid cross-section shape with spiral path between the discharge chamber to the outlet.

Although the above discussion referred to particular numbers for the discharge ports and the vortex chamber inlets, these elements may be present in other numbers. For example, the discharge port could be one up to any number that would allow for them to be adequately spaced around the disk-pack module (i.e., dependent in part on the size of the main housing). The number of vortex chamber inlets could also be different, once again dependent in part on the size of the vortex chamber.

Another variant for the water treatment systems is to place the conduit that connects the intake module to the vortex module internal to the system through, for example, internal channels or passageways.

f. Water Treatment Process Effect

The process, when initiated, particularly in water that has not been processed previously, typically causes the emission of gases which manifest in the form of effervescence. Initially, bubbling can be extremely vigorous, with the bubbles ranging in size from quite large (sometimes up to a half inch in diameter) to millions of micro-bubbles. After a period of time, the larger bubbles begin to subside and the micro-bubbles tend to diminish in size as they increase in volume. It is not uncommon for visible out-gassing to subside to a point of being virtually undetectable. This initial out-gassing usually corresponds to an immediate rise or fall in pH, depending on the initial pH and/or disk gap tolerances and/or material used in the disk-pack. Some water that is neutral to basic can drop into a low acidic range, as determined by use of a pH meter, once the process is initiated, which is the result of high levels of dissociative effervescence and Hydrogen ion activity. Within two minutes of cessation of the process, pH values will rise above the neutral range. On occasion, gases have been collected from the effervescence and exposed to flame, often resulting in ignition/flashing, clearly demonstrating an elemental dissociative effect.

When processed water is reprocessed, the water may show little or no effervescence. If the processed water is then run through a centrifugal pump, the structure is apparently broken down and the water will again effervesce. If the water is allowed to settle for hours/days, it will reorganize/restructure and exhibit minimal effervescence upon reprocessing.

g. Salt Water Experiment

FIG. 19 illustrates a water tank 930K used for this salt water experiment. The water dissociation system included an inlet duct (the metallic ribbed duct) 480K directed to the lower areas of the water tank 930K feed into the top of a water dissociation system 85K, which is discussed above in connection with FIGS. 13A and 13B (without the housing). Although the experiment was performed using an inlet duct 480K, this duct could be omitted and the water processing system used. FIGS. 20A-20D illustrate different views of the water dissociation system while it is processing the water present in the water tank. FIGS. 21A-21C illustrate different views of the impact on the water processing on the activity along the water surface.

While the invention has been described with reference to certain preferred embodiments, numerous changes, alterations and modifications to the described embodiments are possible without departing from the spirit and scope of the invention, as defined in the appended claims and equivalents thereof. The number, location, and configuration of the cylinders described above and illustrated are examples and for illustration only.

As used above "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic. "Substantially" also is used to reflect the existence of manufacturing tolerances that exist for manufacturing components.

The foregoing description describes different components of embodiments being "in fluid communication" to other components. "In fluid communication" includes the ability for fluid to travel from one component/chamber to another component/chamber.

Based on this disclosure, one of ordinary skill in the art will appreciate that the use of "same", "identical" and other similar words are inclusive of differences that would arise during manufacturing to reflect typical tolerances for goods of this type.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

I claim:

1. A system for producing and collecting gas comprising:
a water tank;
a hood engaging said water tank, said hood including at least one port;
at least one water dissociation system in said water tank, said water dissociation system including
a motor;
a driveshaft engaging said motor;
a vortex module having
a housing,
a plurality of inlets spaced around the periphery of the housing near a top of said housing, and
a vortex chamber formed in said housing and in fluid communication with said plurality of inlets; and
a disk-pack module having
a housing having a turbine chamber,
a plurality of discharge outlets providing a fluid pathway from said turbine chamber to outside of said disk-pack housing, and
a disk-pack having an expansion chamber formed in an axial center and in fluid communication with said vortex chamber, said disk-pack having a plurality of spaced apart disks providing passageways between said expansion chamber and said discharge chamber, said disk-pack engaging said driveshaft.

2. The system according to claim 1, wherein said disk-pack includes a plurality of wing shims connected to said plurality of disks, said wing shims maintain the spacing between the disks and the alignment of the disks to each other.

3. The system according to claim 1, further comprising a gas separation system in fluid communication with said port of said hood.

4. The system according to claim 3, wherein said gas separation system includes at least one permeable membrane and collection port downstream of said at least one permeable membrane.

5. The system according to claim 1, further comprising at least one sensor proximate to said port of said hood.

6. The system according to claim 5, wherein said sensor is a flow sensor.

7. The system according to claim 1, further comprising a port along a side of said water tank and above a water fill point in said water tank,
said port further including an offshoot for collection of Hydrogen where the offshoot extends up from the port.

8. A method for production of substantially fresh water from salt water comprising:
placing water into a processing tank such that the water level is sufficient to cover any inlet and any discharge of any water dissociation system present in the processing tank;
operating each of the water dissociation systems in the processing tank by
rotating a disk-pack turbine in a disk-pack module of each of the water treatment systems,
spinning a water to create a vortex where the water that enters the vortex is located inside the processing tank,
discharging the water from the vortex module into an expansion chamber formed in the disk-pack turbine of the disk-pack module,
channeling the water between spaces that exist between disks of the disk-pack turbine to travel from the expansion chamber to at least one discharge channel surrounding the disk-pack turbine, and
discharging the water through at least one discharge outlet;
collecting gas through a port proximate a top of the processing tank; and
routing the collected gas into a chiller/condenser unit to produce substantially fresh water.

9. The method according to claim 8, wherein the system substantially performs all of the steps when the disk-pack turbines are rotating.

10. The method according to claim 8, further comprising adjusting a speed of rotation of the disk-pack turbines during operation.

11. The method according to claim 8, further comprising:
routing the gas from the processing tank to a gas capture system; and
separating the gas into at least two separate gas flows with the gas capture system.

12. The method according to claim 8, wherein placing water into the processing tank includes circulating water through the processing tank; and
the method further comprising controlling the rate of circulation of salt water at least in part based on a salinity reading from a salinity sensor to maintain the salt water being discharged from the processing tank within predetermined salinity threshold above the salt water source.

13. A disk-pack turbine comprising:
a first disk having an axially centered opening passing therethrough, and
a second disk; and
wherein each of said first disk and said second disk includes a set of waveforms and a plurality of vanes having channels and ridges where the set of waveforms and said plurality of vanes are centered about the opening of said first disk.

14. The disk-pack turbine according to claim 13, wherein one of said first disk and said second disk includes a plurality of vertical members spaced around the axial center of said disk, and
the other of said first disk and said second disk includes a plurality of recesses, each of which receives one of said vertical members.

15. The disk-pack turbine according to claim 14, wherein said vertical members are aligned with a radius extending from said center of said disk.

16. The disk-pack turbine according to claim 13, wherein between neighboring vertical members at least one of a convergent channel and a divergent channel is formed.

17. The disk-pack turbine according to claim 13, wherein a width of said channels of said vanes increases at said channel approaches a periphery of said first disk or said second disk.

18. The disk-pack turbine according to claim 13, wherein said channels are curved along their length.

19. The disk-pack turbine according to claim 13, wherein said channels each includes an S-curve.

20. The disk-pack turbine according to claim 13, wherein said set of waveforms includes hyperbolic waveforms.

* * * * *